US005438296A

United States Patent [19]

Kimura

[11] Patent Number: 5,438,296

[45] Date of Patent: Aug. 1, 1995

[54] MULTIPLIER AND SQUARING CIRCUIT TO BE USED FOR THE SAME

[75] Inventor: Katsuji Kimura, Tokyo, Japan

[73] Assignee: NEC Corporation, Tokyo, Japan

[21] Appl. No.: 277,302

[22] Filed: Jul. 22, 1994

Related U.S. Application Data

[63] Continuation of Ser. No. 851,192, Mar. 13, 1992, abandoned.

[30] Foreign Application Priority Data

| | | | |
|---|---|---|---|
| Mar. 13, 1991 | [JP] | Japan | 3-73977 |
| May 16, 1991 | [JP] | Japan | 3-141005 |
| May 23, 1991 | [JP] | Japan | 3-147770 |

[51] Int. Cl.[6] .......... G06G 7/12; G06F 7/44

[52] U.S. Cl. .......... 327/560; 327/563; 327/575; 327/577; 327/356; 327/357; 327/359; 327/361

[58] Field of Search .......... 307/272.2, 289, 455, 307/492, 494; 327/560, 563, 355, 356, 357, 359, 361, 575, 577

[56] References Cited

U.S. PATENT DOCUMENTS

| | | | |
|---|---|---|---|
| 4,357,547 | 11/1982 | Espe et al. | 307/289 |
| 4,965,528 | 10/1990 | Okanobu | 330/252 |
| 5,027,005 | 6/1991 | Kitsuta et al. | 307/455 |
| 5,057,717 | 10/1991 | Kimura | 307/492 |
| 5,134,309 | 7/1992 | Matsumoto et al. | 307/494 |
| 5,155,388 | 10/1992 | Corcoran et al. | 307/455 |
| 5,177,380 | 1/1993 | Birrittella | 307/272.2 |
| 5,200,650 | 4/1993 | Cowley et al. | 307/455 |

OTHER PUBLICATIONS

Patent Abstracts of Japan, vol. 012, No. 246.

Messtechnik, vol. 80, No. 9, Sep. 1972, pp. 257–262, Zabler, "Neue Transistorquadrierstufe mit Glatter Parabelkennlinie zur Realisierung eines einfachen Parabelmultiplizierers hoher Genauigkeit".

IEEE Journal of Solid–State Circuits, vol. SC22, No. 6, Dec. 1987, pp. 1064–1073, Pena–Finol et al., "A MOS four–quadrant analog multiplier using the quarter–square techniqe".

*Primary Examiner*—Timothy P. Callahan
*Assistant Examiner*—Trong Phan
*Attorney, Agent, or Firm*—Sughrue, Mion, Zinn, Macpeak & Seas

[57] ABSTRACT

A multiplier circuit includes first and second squaring circuits each having a differential input terminal pair. A first input terminal of the differential input terminal pair of the first squaring circuit is applied with a first input voltage and the second input terminal thereof is applied with a second input voltage opposite in phase to the first input voltage. A first input terminal of the differential input terminal pair of the second squaring circuit is supplied with the second input voltage and the second input terminal thereof is applied with the first input voltage. The first and second squaring circuits each includes two sets of unbalanced differential transistor pairs which are arranged so that their inputs are opposite in phase and their outputs are connected in common. The transistors of each unbalanced differential transistor pair have different emitter sizes. Two transistors, having different emitter sizes and constituting a differential transistor pair may be connected with an emitter resistor having a resistance value inversely proportional to the emitter size ratio of the transistors forming the differential transistor pair. The two transistors constituting each differential transistor pair may be equal in emitter size. In this case, only one transistor thereof has an emitter resistor connected to it.

28 Claims, 24 Drawing Sheets

MULTIPLIER AND SQUARING CIRCUIT TO BE USED FOR THE SAME

This is a Continuation of application Ser. No. 07/851,192, filed Mar. 13, 1992, now abandoned.

BACKGROUND OF THE INVENTION

1. Field of the Invention

This invention relates to a multiplier and a squaring circuit to be used for the same and more particularly, to a multiplier including a plurality of squaring circuits having differential input terminal pairs and adapted to be arranged on a bipolar integrated circuit and a squaring circuit to be used for the same.

2. Description of the Prior Art

Conventional multipliers are a Gilbert multiplier in general. The Gilbert multiplier has such a structure that transistor pairs are provided in a two-stage stack manner and a constant electric current source I0 as shown in FIG. 1. The operation thereof will be explained below.

In FIG. 1, an electric current (emitter current) IE of a junction diode forming a transistor can be expressed by the following equation (1), where Is is saturation current, k is Boltzmann's constant, q is a unit electron charge, VBE is voltage between base and emitter and T is absolute temperature.

$$IE = Is \cdot exp(q \cdot VBE/kT) - 1 \quad (1)$$

Here, if VT=kT/q, as VBE>>VT, when exp(-VBE/VT)>>1 in Eq. (1), the emitter current IE can be approximated as follows;

$$IE \simeq Is \cdot exp(VBE/VT) \quad (2)$$

As a result, collector currents IC43, IC44, IC45, IC46, IC41 and IC42 of the transistors Q43, Q44, Q45, Q46, Q41 and Q42 can be expressed by the following equations (3), (4), (5), (6), (7) and (8), respectively;

$$IC43 = \frac{\alpha F \cdot IC41}{1 + \exp(-V41/VT)} \quad (3)$$

$$IC44 = \frac{\alpha F \cdot IC41}{1 + \exp(V41/VT)} \quad (4)$$

$$IC45 = \frac{\alpha F \cdot IC42}{1 + \exp(V41/VT)} \quad (5)$$

$$IC46 = \frac{\alpha F \cdot IC42}{1 + \exp(-V41/VT)} \quad (6)$$

$$IC41 = \frac{\alpha F \cdot I0}{1 + \exp(-V42/VT)} \quad (7)$$

$$IC42 = \frac{\alpha F \cdot I0}{1 + \exp(-V42/VT)} \quad (8)$$

In the above equations, V41 is an input voltage of the transistors Q43, Q44, Q45 and Q46, V42 is an input voltage of the transistors Q41 and Q42, αF is current amplification factor thereof designated by the large signal forward gain for the common base configuration.

Hence, the collector currents IC43, IC44, IC45 and IC46 of the transistors Q43, Q44, Q45 and Q46 can be expressed by the following equations (9), (10), (11) and (12), respectively;

$$IC43 = \frac{\alpha F^2 \cdot I0}{\{1 + \exp(-V41/VT)\}\{1 + \exp(-V42/VT)\}} \quad (9)$$

-continued $$IC44 = \frac{\alpha F^2 \cdot I0}{\{1 + \exp(-V41/VT)\}\{1 + \exp(-V42/VT)\}} \quad (10)$$

$$IC45 = \frac{\alpha F^2 \cdot I0}{\{1 + \exp(V41/VT)\}\{1 + \exp(V42/VT)\}} \quad (11)$$

$$IC46 = \frac{\alpha F^2 \cdot I0}{\{1 + \exp(-V41/VT)\}\{1 + \exp(V42/VT)\}} \quad (12)$$

As a result, the differential current ΔI between an output current IC43–45 and an output current IC44–46 can be expressed by the following equation (13);

$$\begin{aligned} I &= IC43\text{–}45 - IC44\text{–}46 \\ &= (IC43 + IC45) - (IC44 + IC46) \\ &= (IC43 - IC46) - (IC44 - IC45) \\ &= \alpha F^2 \cdot I0 \cdot \{\tanh(V42/2VT)\} \cdot \\ &\quad \{\tanh(V42/2VT)\} \end{aligned}$$

Here, tanh x can be expanded in series as shown by the following equation (14) as;

$$tanh\ x = x - (x3/3) \quad (14),$$

so that if x<<1, it can be approximated as tanh x=x.

Accordingly, if V41<<2VT and V42<<2VT, the differential current ΔI can be approximated by the following equation (15); From Eq. (15), it can be found that the circuit shown in FIG. 1 becomes a multiplier for the input voltages V41 and V42 as a small signal.

$$I \simeq (\tfrac{1}{4})\ (\alpha F/VT)^2 \cdot V41 \cdot V42 \quad (15)$$

In this case, however, the conventional Gilbert multiplier as explained above has transistor pairs stacked in two stages, so that there arises such a problem that the source voltage cannot be decreased.

Next, a conventional squaring circuit formed on a C-MOS integrated circuit obtains a squaring characteristic by using a MOS transistor at the source follower as shown in FIG. 2. The drain current Id thereof can be expressed by the following equation (16) in the saturation region, where W is gate width, L is gate length, VGS is voltage between gate and source, Vt is threshold voltage, μn is mobility of electron, and COX is unit gate oxide film capacity;

$$Id = \mu n \cdot (COX/2)\ (W/L)\ (VGS - Vt)^2 \quad (16)$$

According to Eq. (16), the drain current Id changes with the threshold voltage Vt. The threshold voltage Vt has a variation on a production basis. This means that with the conventional squaring circuit using MOS transistor at the source follower, the drain current Id cannot be made constant even by applying the same gate voltage VGS. As a result, there arises such a problem that the conventional squaring circuit is difficult to be integrated on a large-scale basis.

In consideration of the above-mentioned problems, an object of this invention is to provide a multiplier capable of reducing a source voltage.

Another object of this invention is to provide a squaring circuit which is easy to be integrated on a large-scale basis and which is adapted to be used for a multiplier.

SUMMARY OF THE INVENTION (1) In a first aspect of this invention, a multiplier is provided which comprises a first and second squaring circuits each having a differential input terminal pair and whose outputs are connected in common. A first input terminal of the first squaring circuit is applied with a first input voltage and a second input terminal thereof is applied with a second input voltage which is opposite in phase to the first input voltage. A first input terminal of the second squaring circuit is applied with the second input voltage and a second input terminal thereof is applied with the first input voltage. The first and second squaring circuits each includes two sets of unbalanced differential transistor paris which are arranged so that their inputs are opposite in phase and their outputs are connected in common. Said unbalanced differential transistor pairs have different emitter sizes from each other.

In the preferred embodiments of this aspect, two squaring circuits are provided whose input signals are opposite in phase from each other and applied to respective differential input terminal pairs. These two squaring circuits are formed of two sets of differential transistor pairs whose emitters to be connected in common are with an emitter size ratio of K:1 (K>1). The two sets of differential transistor pairs are arranged so that the bases of the transistors which are respectively unequal in emitter size are connected in common for making a differential input terminal pair. The four sets of differential transistor pairs are arranged so that the collectors of four transistors which are respectively equal in emitter size are connected in common for making respective differential outputs.

Two transistors having different emitter sizes constituting each differential transistor pair may be connected with an emitter resistor with a resistant value inversely proportional to the emitter size ratio to the both or one of them.

Two transistors constituting each differential transistor pair may be made equal in emitter size to each other. In this case, only one transistor thereof has an emitter resistior to be connected. Also, in case of being equal in emitter size, one transistor thereof may have a Darlington connection.

(2) In a second aspect of this invention, similar to the first aspect, a multiplier is provided which comprises a first and second squaring circuits. That is, it comprises the first squaring circuit including a first and second unbalanced differential transistor pairs whose outputs are connected in common and the second squaring circuit including a third and fourth unbalanced differential transistor pairs whose outputs are connected in common, and the outputs of the both squaring circuits are connected in common. A first input voltage is applied between one input terminal of said first unbalanced differential transistor pair and one input terminal of said second unbalanced differential transistor pair, and a second input voltage is applied between the other input terminal of the first unbalanced differential transistor pair and the other input terminal of the second unbalanced differential transistor pair. The second input voltage is applied between one input terminal of said third unbalanced differential transistor pair and one input terminal of said fourth unbalanced differential transistor pair, and the first input voltage is applied between the other input terminal of said unbalanced differential transistor pair and the other input terminal of said fourth unbalanced differential transistor pair. Two transistors including each unbalanced differential transistor pair have different emitter sizes from each other as in the first aspect.

In the preferred embodiments of this aspect, a first and second differential input terminal pairs whose input signals are opposite in phase to each other and four sets of differential transistor pairs whose emitters to be connected in common are with an emitter size ratio of K:1 (K>1). In the four sets of differential transistor pairs, the base of the transistor having an emitter size ratio of K of the first differential transistor pair and that of the transistor having an emitter size ratio of 1 of the third differential transistor pair are connected in common to one input terminal (one polarity) of said first differential input terminal pair. Also, the base of the transistor having an emitter size ratio of 1 of the first differential transistor pair and that of the transistor having an emitter size ratio of K of the fourth differential transistor pair are connected in common to one input terminal (one polarity) of said second input terminal pair. The base of the transistor having an emitter size ratio of K of the second differential transistor pair and that of the transistor having an emitter size ratio of 1 of said fourth differential transistor pair are connected in common to the other input terminal (the other polarity) of said first input terminal pair. The base of the transistor having an emitter size ratio of 1 of the second differential transistor pair and that of the transistor having an emitter size ratio of K of the third differential transistor pair are connected in common to the other input terminal (the other polarity) of said second input terminal pair. In addition, the collectors of four transistors which are respectively equal in emitter size are connected in common for making respective differential outputs.

As in the first aspect, two transistors different in emitter size from each other, which constitutes each differential transistor pair, may be connected respectively with emitter resistors having a resistant value inversely proportional to the emitter size ratio, or only one of them may be connected with an emitter resistor having a resistant value as above. In addition, two transistors constituting each differential transistor pair may be made equal in emitter size, but, only one transistor thereof is connected with an emitter resistor in this case. In case of being equal in emitter size, one of two transistors constituting each differential transistor pair may have a Darlington connection.

(3) In a third aspect of this invention, a multiplier is provided which comprises a first, second and third squaring circuits each having a differential input terminal pair and which is arranged so that the output of said first squaring circuit is opposite in phase to those of said second and third squaring circuits. In this multiplier, a first input voltage is applied to one input terminal of said first squaring circuit and a second input voltage is applied to the other input terminal thereof. The first input voltage is applied across an input terminal pair of said second squaring circuit and the second input voltage is applied across an input terminal pair of said third squaring circuit. The two transistors constituting each differential transistor pair have different emitter sizes from each other as in the first and second aspects.

In the preferred embodiments of this aspect, the multiplier comprises a first and second input terminal pairs whose input signals are equal in phase to each other and whose one input terminals are made as a common input terminal and three squaring circuits, first, second and third, which are arranged between said first and second input terminal pairs. The three squaring circuits each includes two sets of unbalanced differential transistor pairs whose emitters to be connected in common are with an emitter size ratio of K:1 (K>1), and in which the collectors of the transistors which are respectively equal in emitter size are connected in common and the bases of the transistors which are respectively unequal in emitter size are connected in common. In addition, one bases of the first and second squaring circuits are connected in common to the other input terminal of said first input terminal pair, and the other bases of the first and third squaring circuits are connected in common to the other input terminal of said second input terminal pair, and the other bases of the second squaring circuit and one bases of said third squaring circuit are connected in common to the common input terminal. In addition, the collectors of the transistors which are respectively equal in emitter size of said second and third squaring circuits are connected in common to be connected respectively to the collectors which are respectively unequal in emitter size of said first squaring circuit.

In this multiplier, as in the first aspect, two transistors having different emitter sizes from each other, which constitute each differential transistor pair, may be connected respectively with emitter resistors having a resistant value inversely proportional to the emitter size ratio, or only one of them may be connected with an emitter resistor having a resistant value as above. In addition, two transistors constituting each differential transistor pair may be made equal in emitter size, but only one transistor thereof is connected with an emitter resistor in this case. In case of being equal in emitter size, one of the transistors of each differential transistor pair may have a Darlington connection.

(4) In a fourth aspect of this invention, additionally to the multiplier of the third aspect, a multiplier is provided which is obtained by addingly provided one squaring circuit to the multiplier of the third aspect. This multiplier comprises a first, second, third and fourth squaring circuits each having a differential input terminal pair, in which the output of the first squaring circuit is opposite in phase to and connected with the outputs of the second, third and fourth squaring circuits. As in the third aspect, a first input voltage is applied to one input terminal of said first squaring circuit, and a second input voltage is applied to the other input terminal thereof. The first input voltage is applied across an input terminal pair of said second squaring circuit, and the second input voltage is applied across an input terminal pair of said third squaring circuit. Across an input terminal pair of said fourth squaring circuit, the first or second input voltage is applied. The two transistors constituting each differential transistor pair have different emitter sizes from each other as in the first, second and third aspects.

In the preferred embodiments of this aspect, the multiplier comprises a first and second input terminal pairs whose input signals are equal in phase to each other and whose one input terminals are made as a common input terminal, and four squaring circuits, first, second, third and fourth, which are arranged between said first and second input terminal pairs. The four squaring circuits each includes two sets of unbalanced differential transistor pairs (driven by respective constant current sources) whose emitters to be connected in common are with an emitter size ratio of K:1 (K>1), and in which the collectors of the transistors which are respectively equal in emitter size are connected in common and the bases of the transistors which are respectively unequal in emitter size are connected in common. In addition, one bases of the first and second squaring circuits are connected in common to the other input terminal of said first input terminal pair, and the other bases of the fist and fourth squaring circuits are connected in common to the other input terminal of said second input terminal pair, the other bases of said second squaring circuit and one bases of said third squaring bases are connected in common to said common input terminal, and the other bases of said third squaring circuit and one bases of said fourth squaring circuit are connected in common. In addition, between the first and third squaring circuits and between the second and fourth squaring circuits, the collectors of the transistors which are respectively equal in emitter size are connected in common, and the collectors of the transistors which are respectively unequal in emitter size are connected in common.

As in the first aspect, two transistors having different emitter sizes from each other, which constitute each differential transistor pair, may be connected respectively with emitter resistors having a resistant value inversely proportional to the emitter size ratio, or only one of them may be connected with an emitter resistor having a resistant value as above. Two transistors constituting each differential transistor pair may be made equal in emitter size, but only one of them is connected with an emitter resistor in this case. In case of being equal in emitter size, one of such two transistors may have a Darlington connection.

Each of the multipliers shown in the first to fourth aspects as above does not have a plurality of differential transistor pairs arranged in a stack manner as of the prior art, but has them arranged so-called in a line transversally to be driven by a constant voltage source. As a result, it can be operated at a lower source voltage than that in the prior art.

(5) In a fifth aspect of this invention, a squaring circuit is provided which is adapted to be used for each multiplier shown above. This squaring circuit comprises a first differential transistor pair including a first MOS transistor having a gate width (W) and gate length (L) ratio (W/L) of one (1) and a second MOS transistor having a ratio (W/L) of H (H≠1), which are driven by a constant current source I0, and a second differential transistor pair including a third and fourth MOS transistors having such a ratio (W/L) as;

$$\{4H \cdot H^{\frac{1}{2}}/(H+1)^2\},$$

which is driven by a constant current source of $$\{2 \cdot H^{\frac{1}{2}}/(H+1)\} \cdot I0.$$

The drains of the first and third transistors are connected in common, and the drains of the second and fourth transistors are connected in common, and the gates of the first and fourth transistors are connected in common and the gates of the second and third transistors are connected in common.

This squaring circuit comprises two sets of differential transistor pairs including MOS transistors each having a gate width and gate length ratio (W/L) appropriately selected for making a differential input. This means that such a squaring circuit that is completely independent of a variation in threshold voltage due to manufacturing dispersion of transistors and adapted to be integrated on a large-scale basis can be realized. Consequently, this squaring circuit can be preferably used instead of those used in these multipliers shown in the first to fourth aspects as above.

DESCRIPTION OF THE PREFERRED EMBODIMENTS

The preferred embodiments of this invention will be described below while referring to FIGS. 3 to 26.

Figure 1:
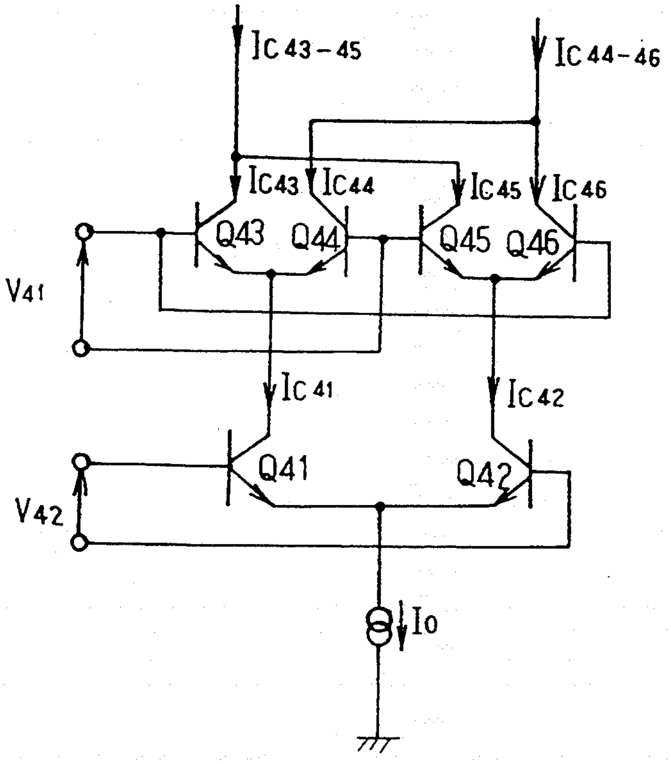
FIG. 1 (Prior Art)
FIG. 1 is a circuit diagram of a conventional multiplier.
Figure 2:
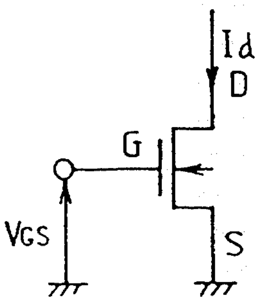
FIG. 2 (Prior Art)
FIG. 2 is a circuit diagram of a conventional squaring circuit using a MOS transistor.
Figure 3:
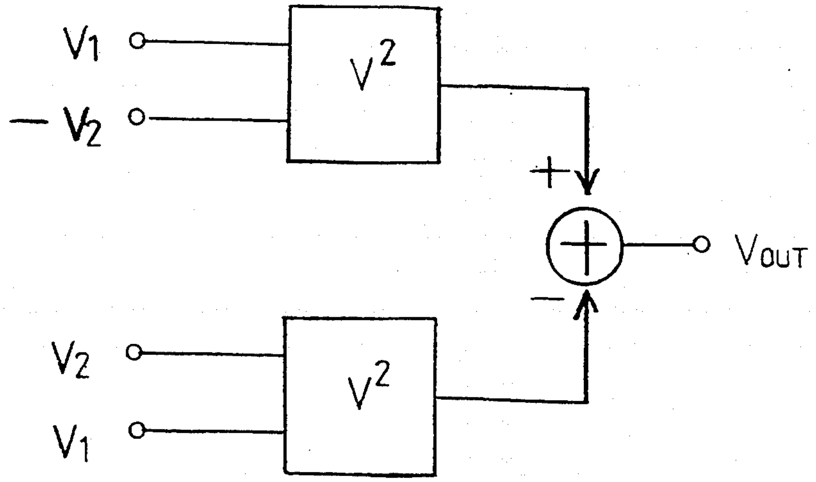
FIG. 3 is a block diagram of a multiplier according to first to sixth embodiments of this invention.

FIG. 3 schematically shows a multiplier according to first to sixth embodiments of this invention. In FIG. 3, as each squaring circuit has a differential input terminal pair, a differential input voltage of a first squaring circuit becomes (V1+V2), and that of a second squaring circuit becomes (V2−V1). As a result, the outputs of these two squaring circuits are subtracted to generate an output voltage VOUT, which can be expressed as follows;

$$\begin{aligned} VOUT &= (V1 + V2)^2 - (V2 - V1)^2 \\ &= 4V1 \cdot V2 \end{aligned} \quad (21)$$

That is, the output voltage VOUT can be expressed by the product (V1·V2) of the first input voltage V1 and the second input voltage V2, which means that such a circuit that comprises two squaring circuits as shown in FIG. 3 has a multiplier characteristic.

[First Embodiment]

Figure 4:
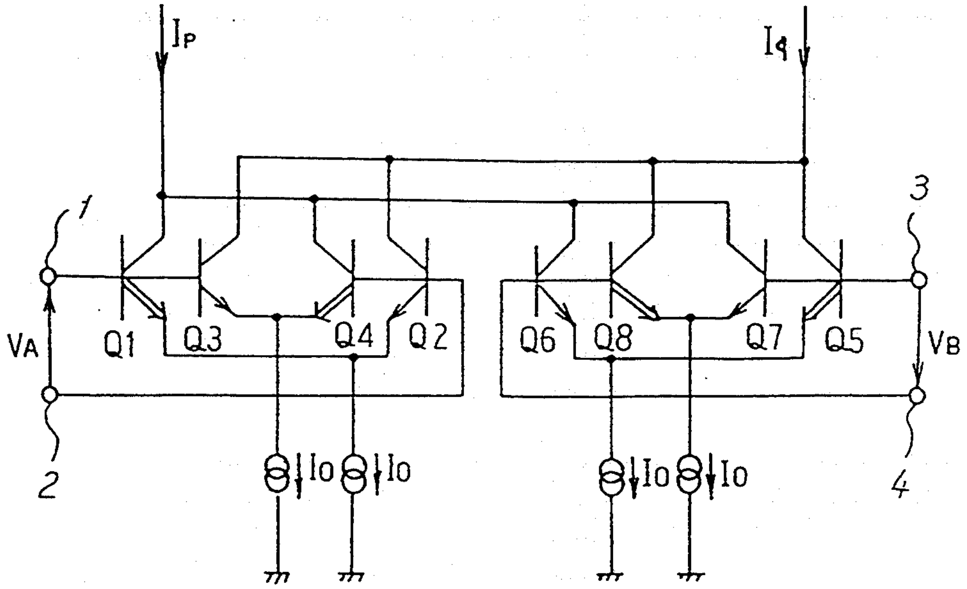
FIG. 4 is a circuit diagram of a multiplier according to a first embodiment of this invention.

FIG. 4 shows a multiplier according to a first embodiment of this invention. This multiplier basically comprises four sets of differential transistor pairs respectively consisting of differential transistor pairs (Q1 and Q2), (Q3 and Q4), (Q5 and Q6), and (Q7 and Q8) whose emitters are connected in common. In this case, if the emitter size of each of one transistors Q2, Q3, Q6 and Q7 of respective four sets of them is made one (1), that of the other transistors Q1, Q4, Q5 and Q8 is made K times (K>1). Also, two sets of differential transistor pairs consisting of the transistors 01 and Q2 and the transistors Q3 and 04, and the two sets of differential transistor pairs consisting of the transistors Q5 and Q6 and the transistors Q7 and Q8 form squaring circuits, respectively. These squaring circuits are supplied with respective electric currents in parallel, and an input signal (voltage VA) to be applied to one differential input terminal pair (1 and 2) is opposite in phase to an input signal (voltage VB) to be applied to the other differential input pair (3 and 4).

In the two squaring circuits which consist respectively of the two sets of transistor pairs (Q1 and Q2) and (Q3 and Q4) and two sets of transistor pairs (Q5 and Q6) and (Q7 and Q8), the bases of the transistors whose emitter sizes are different from each other, that is, of the transistors Q1 and Q3, Q2 and Q4, Q6 and Q8, and Q5 and Q7 are connected in common, and the bases of the transistors 01 and Q3 are connected to one input terminal 1 of the differential input terminal pair (1 and 2), and the bases of the transistors Q2 and Q4 are connected to the other input terminal 2 thereof. In addition, the bases of the transistors Q5 and Q7 are connected to one input terminal 3 of the differential input terminal pair (3 and 4), and the bases of the transistors Q6 and Q8 are connected to the other input terminal 4 thereof. Also, the collectors of the transistors whose emitter sizes are equal to each other, that is, of the four transistors Q1 and Q4, Q6 and Q7 and of the four transistors Q2 and Q3, and Q5 and Q8 are connected in common to form differential output signals Ip and Iq, respectively. The transistor pairs are connected to respective constant electric current sources I0.

In the multiplier thus obtained, the collector currents IC1 and IC2 of the differential transistor pair Q1 and 02 can be expressed as follows;

$$IC1 = \frac{\alpha F \cdot I0}{1 + (1/k) \cdot \exp(-VA/VT)} \quad (22)$$

$$IC2 = \frac{\alpha F \cdot I0}{1 + k \cdot \exp(VA/VT)} \quad (23)$$

where, αF·I0 can be expressed as follows:

$$\alpha F \cdot I0 = IC1 + IC2 \quad (24)$$

Hence, the difference between the collector currents, (IC1−IC2), can be expressed as follows;

$$IC1 - IC2 = \quad (25)$$

$$\alpha F \cdot I0 \frac{k^{\frac{1}{2}} \cdot \exp \cdot (VA/2VT) - (1/k) \cdot \exp \cdot (-VA/2VT)}{k^{\frac{1}{2}} \cdot \exp \cdot (VA/2VT) + (1/k) \cdot \exp \cdot (-VA/2VT)}$$

Here, supposing that VK is expressed as;

$$VK = VT \cdot 1n(K) \quad (26),$$

K can be obtained as follows;

$$K = exp \cdot (VK/VT) \quad (27)$$

Thus, Eq. (25) showing the difference between the collector currents IC1 and IC2 can be expressed by the following equation (28);

$$IC1 - IC2 = \alpha F \cdot \quad (28)$$

$$I0 \frac{\exp \cdot \{(VA + VK)/2VT\} - \exp \cdot \{(-VA + VK)/2VT\}}{\exp \cdot \{(VA + VK)/2VT\} + \exp \cdot \{(-VA + VK)/'VT\}} =$$

$$\alpha F \cdot I0 \cdot \tanh\{(VA + VK)/2VT\}$$

Next, the difference between the collector currents IC3 and IC4 of respective differential transistor pair Q3 and Q4 can be obtained in the same way as shown above, that is, $$\begin{aligned} IC4 - IC3 &= \alpha F \cdot I0 \cdot \tanh\{(-VA + VK)/2VT\} \\ &= -\alpha F \cdot I0 \cdot \tanh\{(VA - VK)/2VT\} \end{aligned} \quad (29)$$

Here, if the sum of .Eq. (28) and Eq. (29) is IA, it can be expressed as follows;

$$\begin{aligned} IA &= IK - IU = (IC1 - IC2) + (IC4 - IC3) \\ &= \alpha F \cdot I0 \cdot [\tanh\{(VA + VK)/2VT\} - \\ &\quad \tanh\{(VA - VK)/2VT\}] \end{aligned} \quad (30)$$

Then, tanh x can be expanded as shown in Eq. (14) when $|x| << 1$, so that when $|VA+VK| << 2VT$ and $|VA-VK| << 2VT$, Eq. (30) becomes as shown by the following equation (31), resulting in being obtainable a differential electric current proportional to the square of the input voltage VA. Accordingly, it can be found that a squaring circuit can be obtained by combiningly using two sets of unbalanced differential transistor pairs having an emitter size ratio of K:1.

$$\begin{aligned} \Delta IA &= (IC1 - IC2) + (IC4 - IC3) \\ &= \alpha F \cdot I0 \cdot [\{VA + VK)/2VT - \\ &\quad (1/3)\{(VA + VK)/2VT\}^3\} \\ &\quad - \{(VA - VK)/2VT - (1/3)((VA + VK)/2VT)^3\}] \\ &= \alpha F \cdot I0 \cdot \{(VK/VT) - (VK/8VT^3)\, VA^2 - \\ &\quad (1/3)(VK/2VT)^3\} \end{aligned} \quad (31)$$

Figure 5:
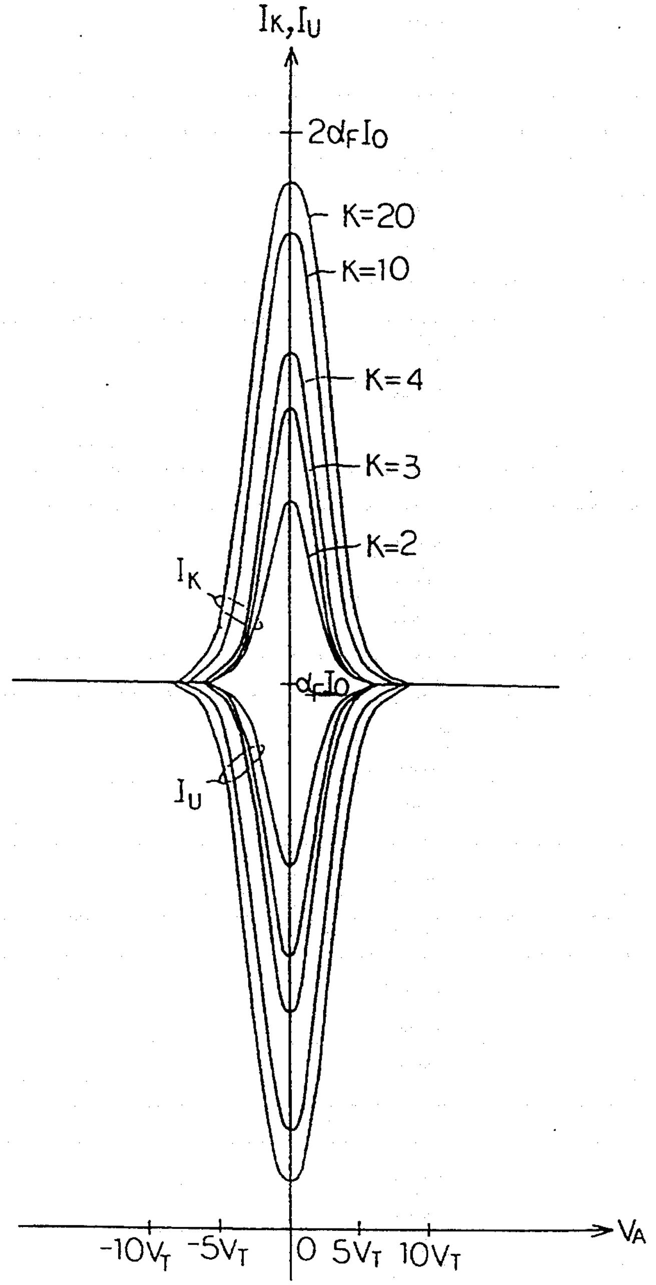
FIG. 5 is an output characteristic diagram of a squaring circuit to be used for the multiplier shown in FIG. 4.

FIG. 5 is an output characteristic diagram of the squaring circuit shown in FIG. 4, in which SPICE simulation values are graphically shown with the K as a parameter. From FIG. 5, it can be found that good squaring characteristic is provided.

Similar to the above explanations, for the transistor pairs (Q5 and Q6) and (Q7 and Q8), the following equations (32), (33) and (34) can be established, and the differential electric current ΔIB between both the differential transistor pairs can be found to be proportional to the square of the input voltage VB as;

$$IC5 - IC6 = -\alpha F \cdot I0 \cdot tanh\}(VB - VK)/2VT\} \quad (32)$$

$$IC8 - IC7 = \alpha F \cdot I0 \cdot tanh\}(VB + VK)/2VT\} \quad (33)$$

$$\begin{aligned} \Delta IB &= (IC5 - IC6) + (IC8 - IC7) \\ &= \alpha F \cdot I0 \cdot \{(VK/VT) - (VK/8VT^8) \cdot \\ &\quad VB^2 - (\tfrac{1}{3})(VK/2VT)^3 \ldots\} \end{aligned} \quad (34)$$

As a result, if the sum of the differential electric currents, ΔIA+ΔIB, is expressed ΔI, the following equation can be established as;

$$\begin{aligned} \Delta I &= \Delta IA + \Delta IB \\ &\approx \{-(\alpha F \cdot I0 \cdot VK)/8VT\} \cdot (VA^2 - VB^2) \end{aligned} \quad (35)$$

And, if the input voltages VA and VB are expressed as;

$$VA = V1 - V2 \quad (36)$$

$$VB = V1 + V2 \quad (37)$$

Eq. (35) can be expressed by the following equation (38), which means that a differential current I proportional to the product of the voltages V1 and V2 can be obtained, thus being obtainable a multiplier.

$$\Delta I \approx \alpha F \cdot I0 \cdot (VK/2VT) V1 \cdot V2 \quad (38)$$

Figure 6:
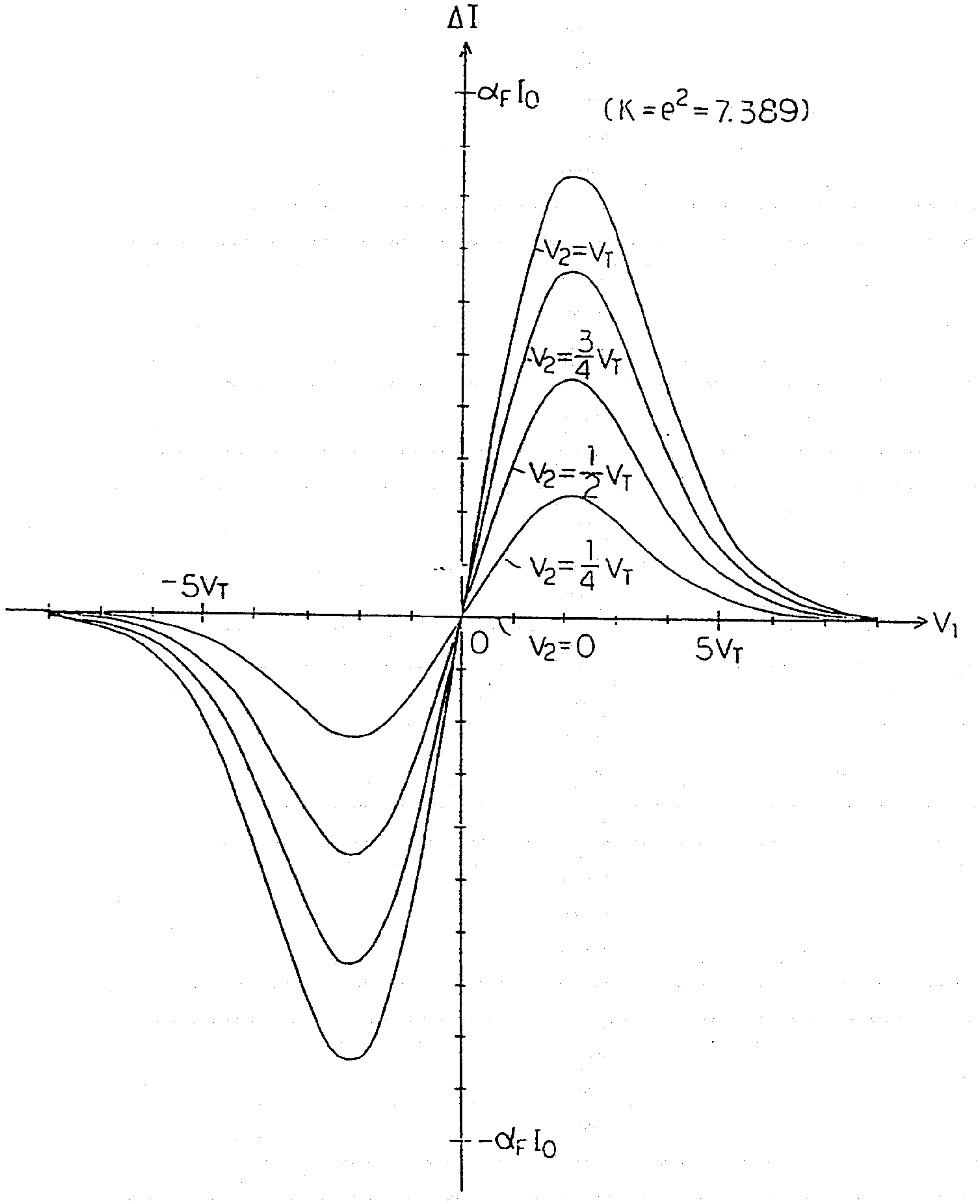
FIG. 6 is an output characteristic diagram of the multiplier shown in FIG. 4.

FIG. 6 is a characteristic diagram of a differential output current I using a hyperbolic tangent function. From this, it can be found that good multiplier characteristic is obtainable in the range of an input voltage smaller than VK.

Figure 7:
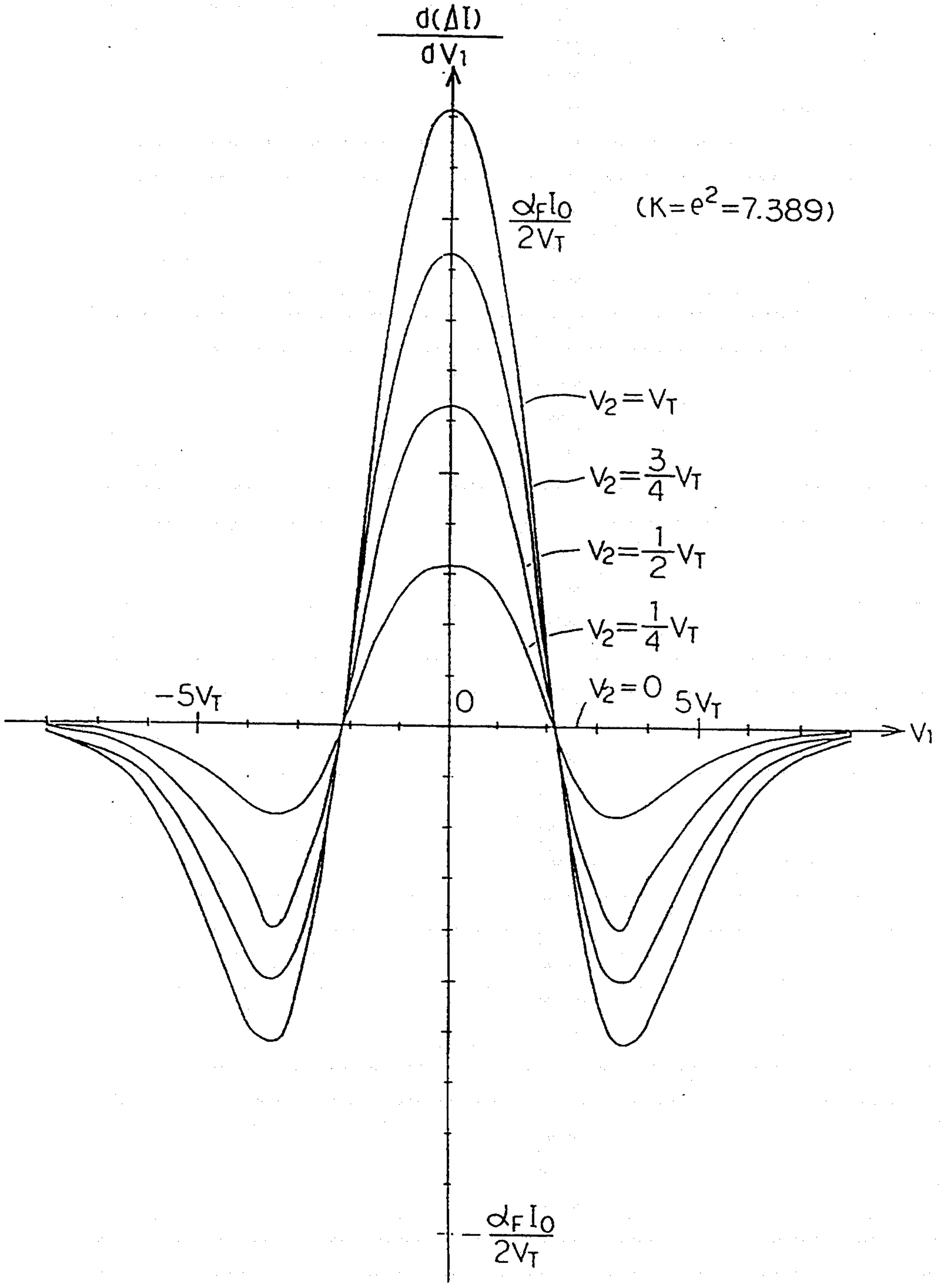
FIG. 7 is a diagram of an output transformer conductance characteristic of the multiplier shown in FIG. 4.

FIG. 7 is a gain characteristic diagram of the multiplier which is obtained by differentiating the differential output current ΔI using a hyperbolic tangent function with respect to the first input voltage V1. From this, it can be found that good multiplier characteristic is obtainable in the range of an input voltage smaller than VK.

Figure 8:
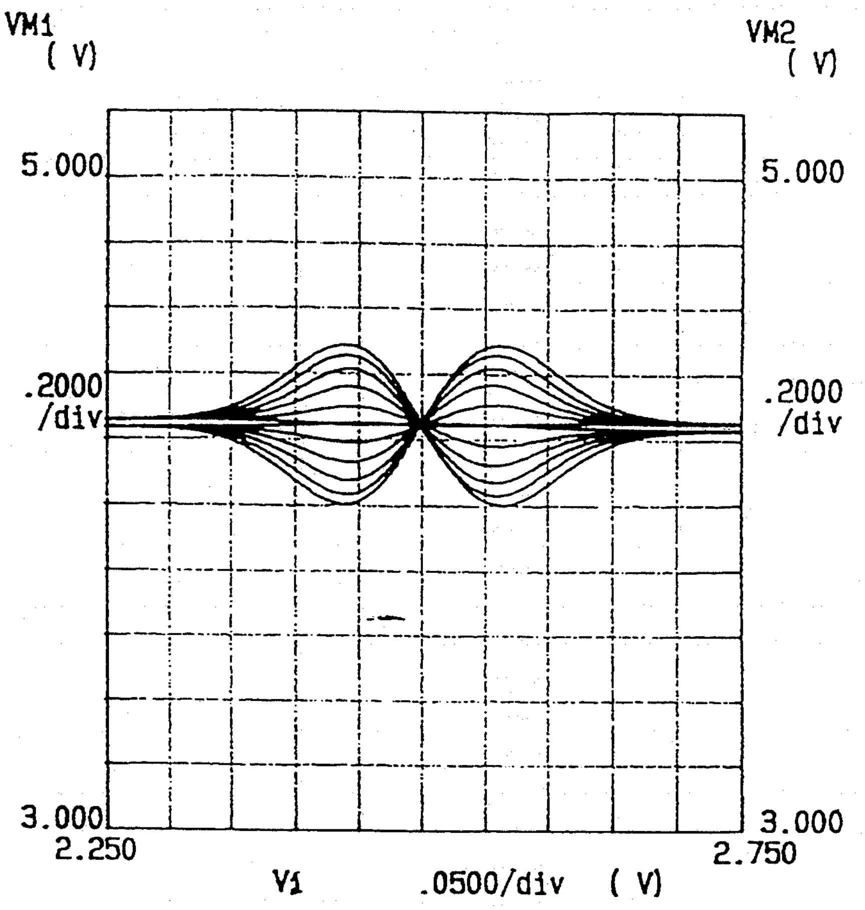
FIG. 8 is an output characteristic diagram of the multiplier shown in FIG. 4.

FIG. 8 shows the result obtained from a multiplier whose individual components were produced as K=7.

The transistor used was of 2SC2785 produced by NEC. From this, it can be found that though an offset is appeared in the output because these components are realized on an individual basis, good multiplier characteristic is obtainable. In addition, this diagram was prepared in such a manner that V2 was changed as a parameter from zero (0) to 100 mV in a step manner at an interval of 20 mV, and converted into voltage as follows;

$$VM1 = VCC - RL \cdot Ip$$

$$VM2 = VCC - RL \cdot Iq$$

[Second Embodiment]

Figure 9:
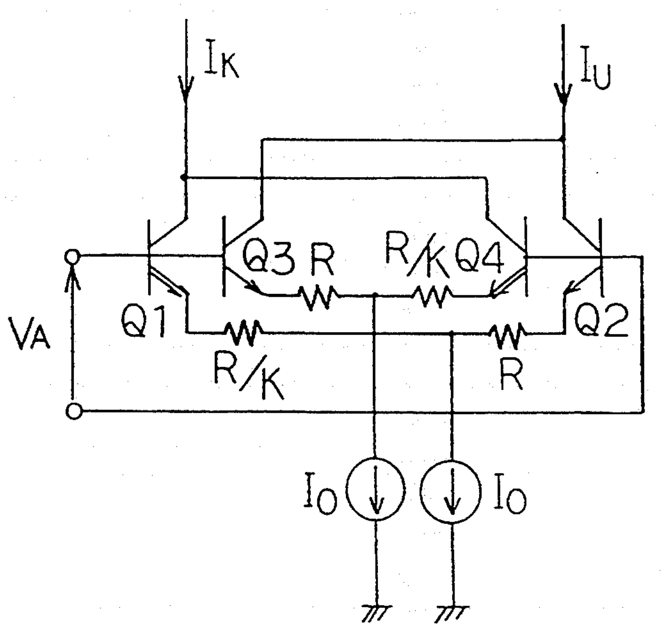
FIG. 9 is a circuit diagram of a squaring circuit to be used for a multiplier according to a second embodiment of this invention.

FIG. 9 shows a squaring circuit to be used for a multiplier according to a second embodiment of this invention. This multiplier comprises two squaring circuits as shown in FIG. 4. The squaring circuit to be used for this embodiment is substantially equal in structure to that in the first embodiment shown in FIG. 4. What is different from the first embodiment is that respective transistors (Q1 and Q2) and (Q3 and Q4) forming two sets of differential transistor pairs have emitter resistors. The transistors Q2 and Q3 with an emitter size of 1 have emitter resistors with a resistant value of R, and the transistors Q1 and Q4 with an emitter size of K have emitter resistors with a resistant value of (R/K) which is inversely proportional to be the emitter size ratio.

Figure 10:
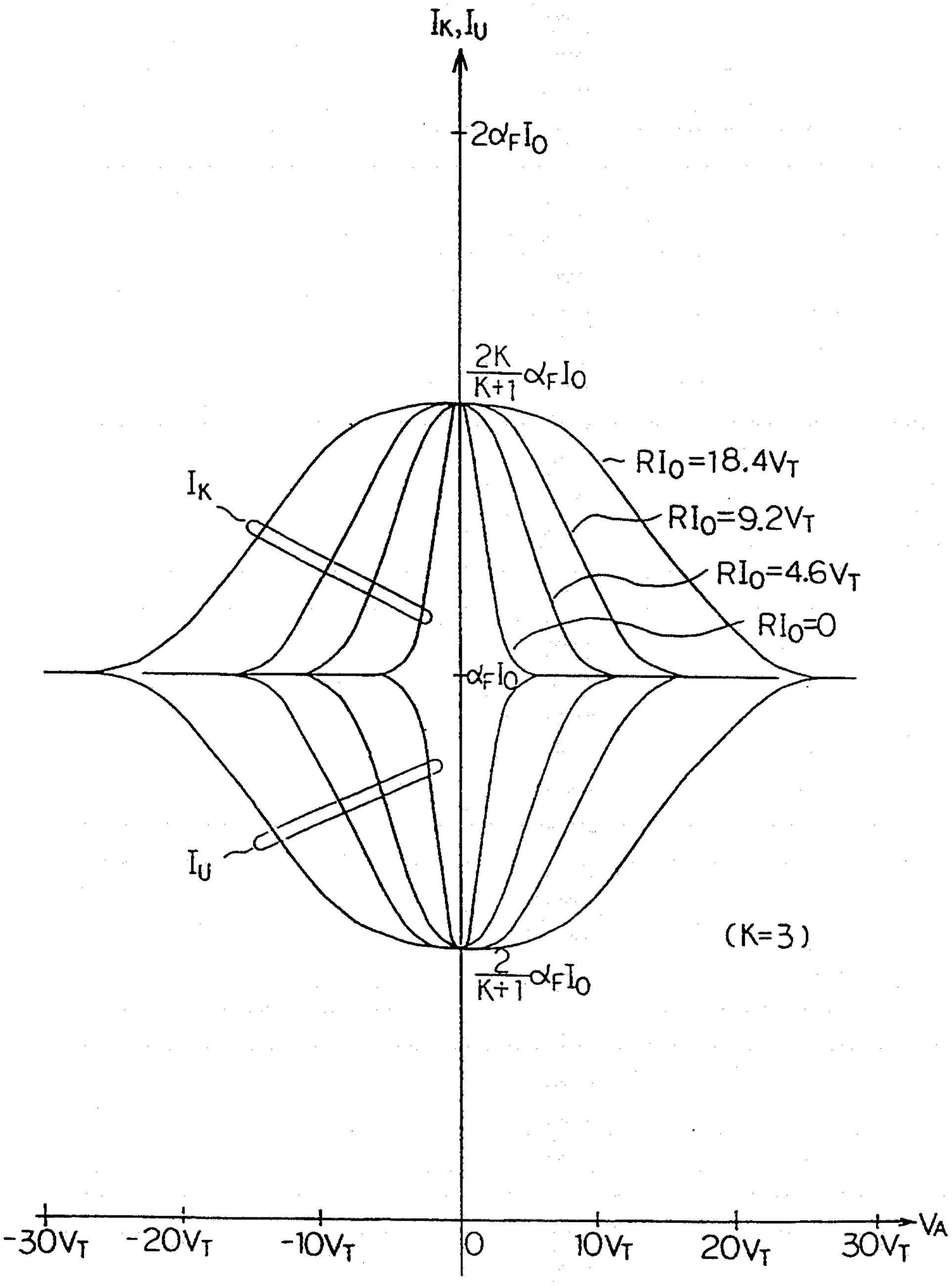
FIG. 10 is an output characteristic diagram of the squaring circuit shown in FIG. 9.

The operational characteristic of this squaring circuit cannot be analytically resolved because of including emitter resistors into differential transistor pairs. As a result, SPICE simulation values were obtained using the product (R·I0) of the resistant value R of the emitter resistance and the current value I0 of the driving current source as a parameter, which is shown in FIG. 10. From FIG. 10, it can be found that the range of input voltage can be expanded and yet good squaring characteristic can be obtained by appropriately selecting the value of the product (R·I0).

Figure 11:
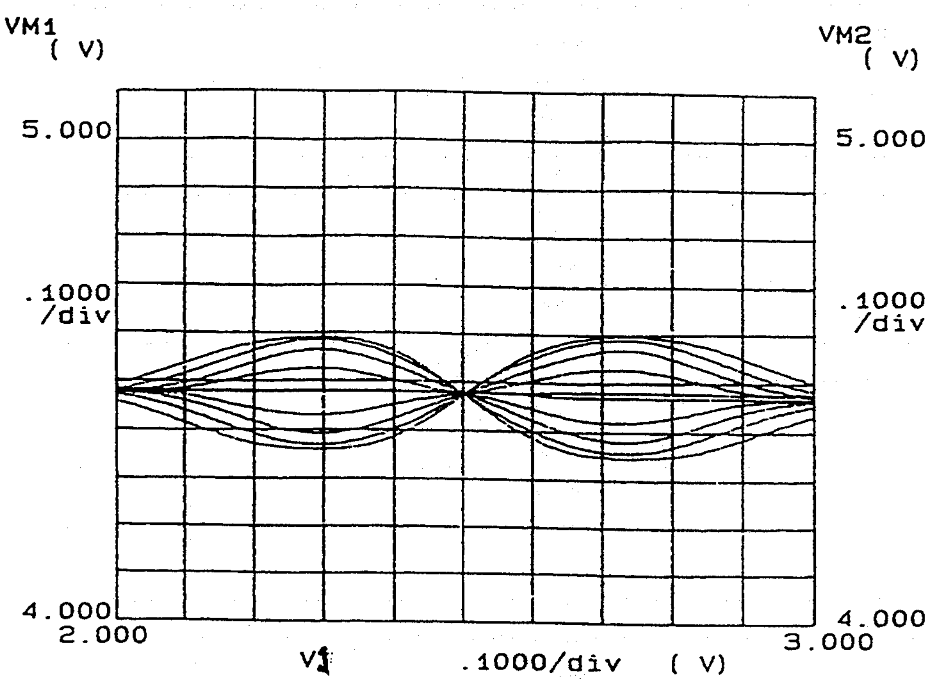
FIG. 11 is an output characteristic diagram of the multiplier according to the second embodiment of this invention.

Next, with K=3, and R·I0=8.6VT, experiments were carried out using individual components, the result of which is shown in FIG. 11. The transistors used was of 2SC2785. From FIG. 11, it can be found that though an offset is appeared in the output because these components are realized on an individual basis, good multiplier characteristic is obtainable. In addition, this diagram was prepared in such a manner that V2 was changed as a parameter from zero (0) to 400 mV in a step manner at an interval of 100 mV. Compared with the result shown in FIG. 8, it can be found that the input voltage range in FIG. 11 is expanded approximately three times. As a result, a multiplier using the squaring circuit having emitter resistors as shown in FIG. 9 makes obtainable good characteristic and yet advantageously expanded input voltage range.

[Third Embodiment]

Figure 12:
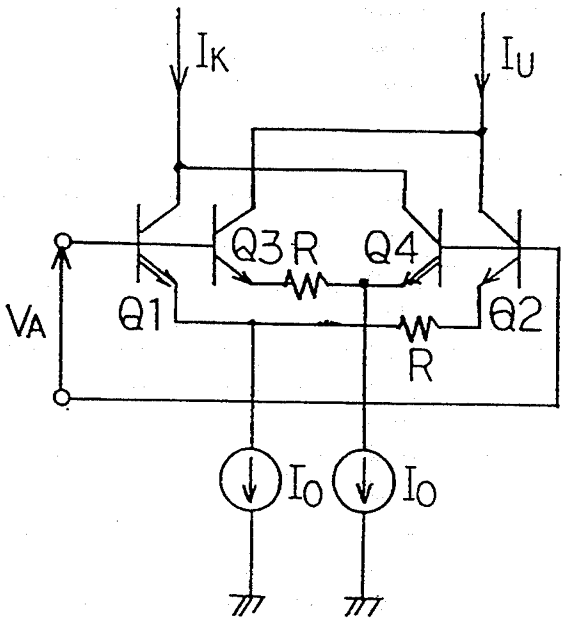
FIG. 12 is a circuit diagram of a squaring circuit to be used for a multiplier according to a third embodiment of this invention.

FIG. 12 is a circuit diagram of a squaring circuit to be used for a multiplier according to a third embodiment of this invention, which comprises two squaring circuits combinedly arranged as shown in FIG. 4. This squaring circuit is substantially equal in structure to that in the first embodiment shown in FIG. 4 excepting that respective transistors (Q1 and Q2) and (Q3 and Q4) forming two sets of differential transistor pairs have emitter resistors on their one transistors. That is, the transistors Q2 and Q3 with an emitter size of 1 each has an emitter resistor with a resistant value of R and the transistors Q1 and Q4 with an emitter size of K each does not have an emitter resistor.

Figure 13:
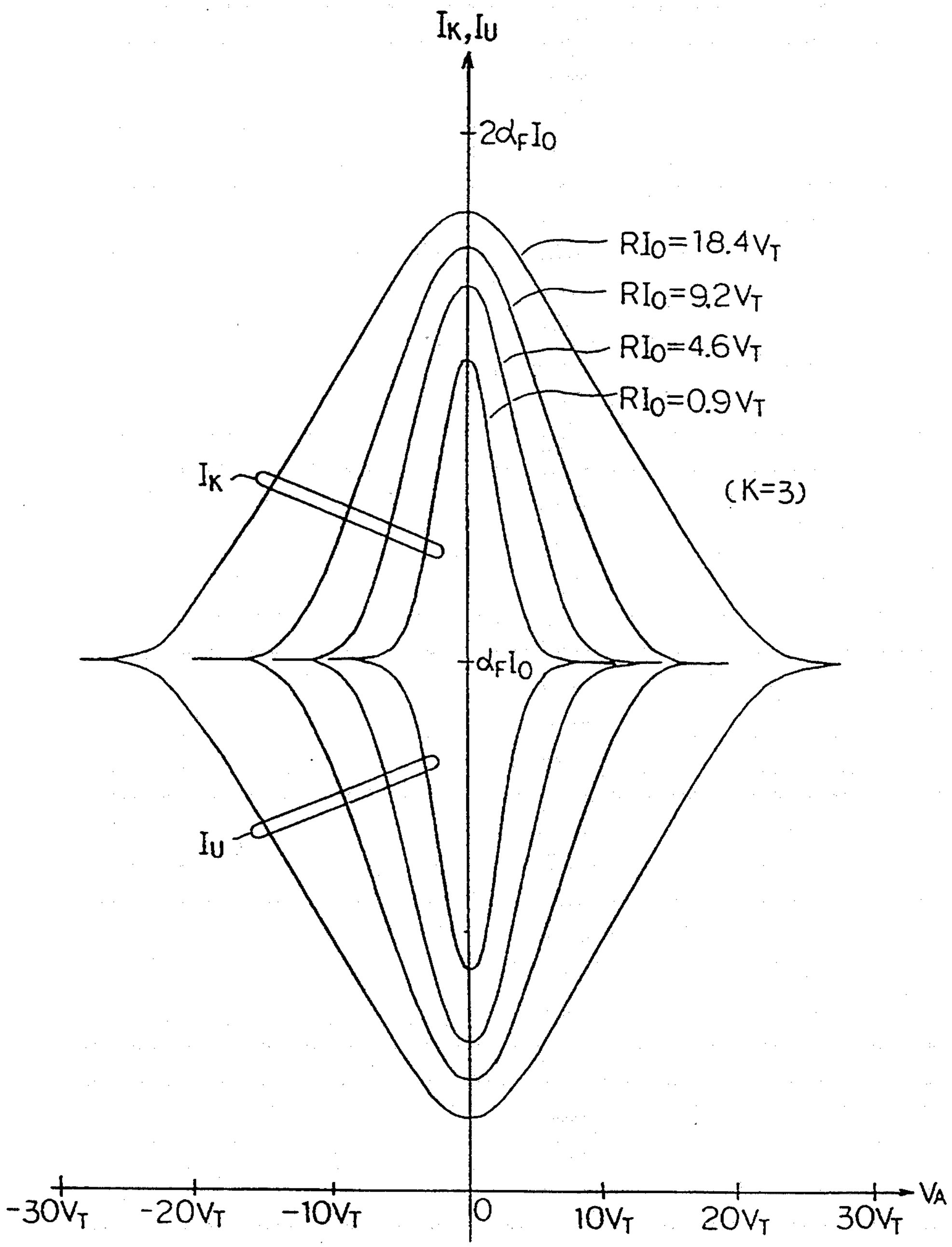
FIG. 13 is an output characteristic diagram of the squaring circuit shown in FIG. 12.

The operational characteristic of this squaring circuit cannot be analytically resolved because of including emitter resistors into differential transistor pairs. As a result, SPICE simulation values were obtained using product (R·I0) of the resistant value R of the emitter resistor and the current value I0 of the driving current source as a parameter, which is shown in FIG. 13. From FIG. 13, it can be found that the range of the input voltage can be expanded and yet good squaring characteristic can be obtained by appropriately selecting the value of the product (R·I0).

Figure 14:
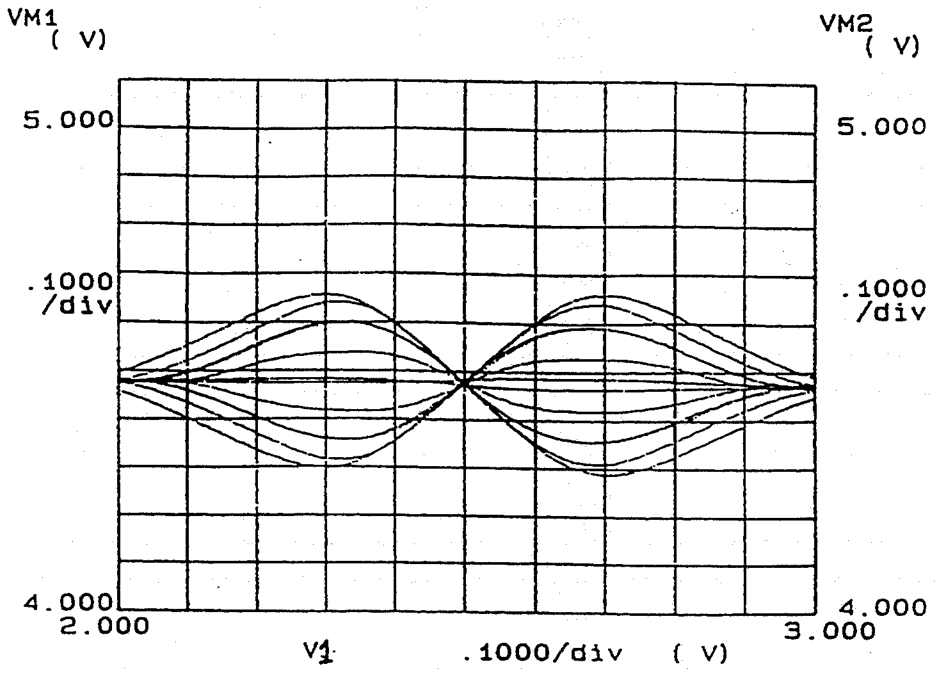
FIG. 14 is an output characteristic diagram of the multiplier according to the third embodiment of this invention.

Next, with K=3 and (R·I0)=8.6 VT, experiments were carried out using individual components, the result of which is shown in FIG. 14. What was used for this purpose was 2SC2785 transistor. From FIG. 14, it can be found that though an offset is appeared in the output because these components are individually realized, good multiplier characteristic is obtainable. In addition, this diagram was prepared in such a manner that V2 was changed as a parameter from zero (0) to 400 mV in a step manner at an interval of 100 mV. Compared with the result shown in FIG. 8, i t can be found that the input voltage range in FIG. 14 is expanded approximately four times. As a result, a multiplier using the squaring circuit having emitter resistors as shown FIG. 12 makes obtainable good characteristic and yet advantageously expanded input voltage range.

[Fourth Embodiment]

Figure 15:
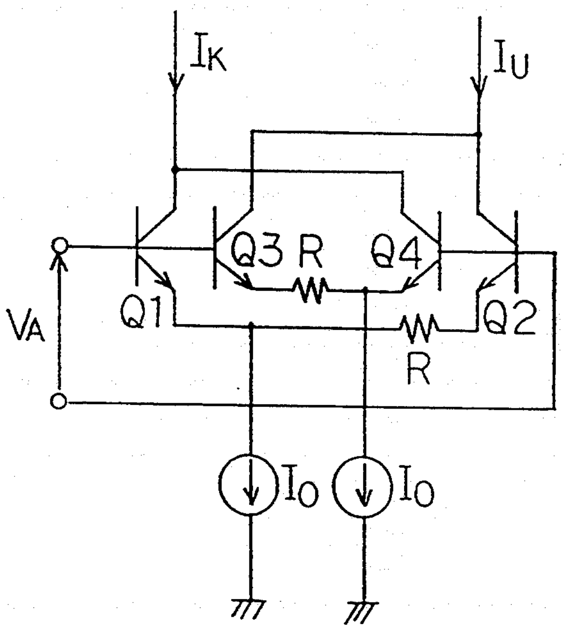
FIG. 15 is a circuit diagram of a squaring circuit to be used for a multiplier according to a fourth embodiment of this invention.

FIG. 15 shows a squaring circuit to be used for a multiplier according to a fourth embodiment of this invention, which comprises two squaring circuit combinedly arranged as shown in FIG. 4, and substantially equal in structure to that in the first embodiment shown in FIG. 4 excepting that respective transistors (Q1 and Q2) and (Q3 and Q4) forming two sets of differential transistor pairs have the same emitter size and yet only the transistors Q2 and Q4 have emitter resistors, respectively.

Figure 16:
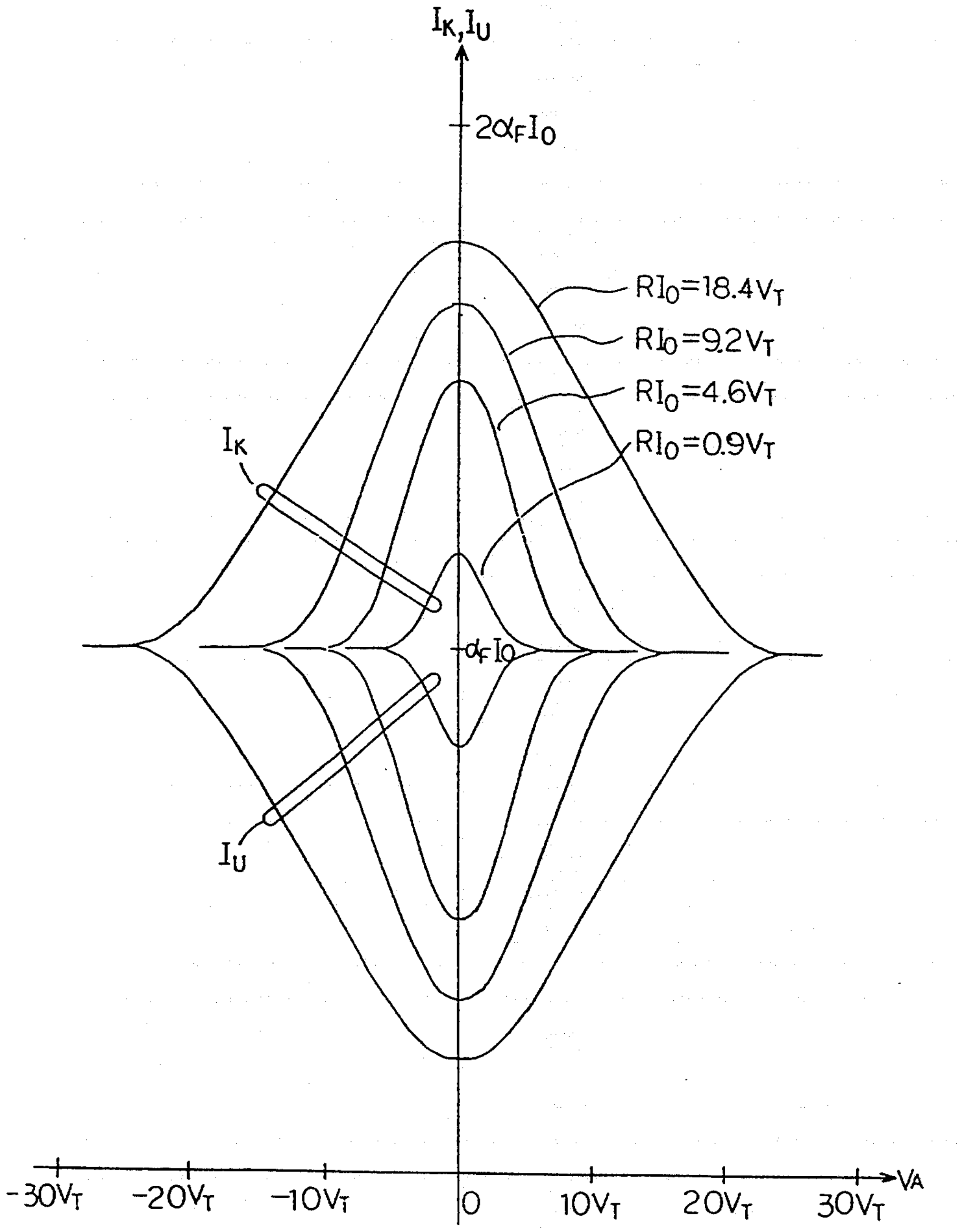
FIG. 16 is an output characteristic diagram of the squaring circuit shown in FIG. 15.

The operational characteristic of this squaring circuit cannot be analytically resolved because including emitter resistors into differential transistor pairs. As a result, SPICE simulation values were obtained using the product (R·I0) of the resistant value R of the emitter resistor and the current value I0 of the driving current source as a parameter, which is shown in FIG. 16. From FIG. 16, it can be found that the input voltage range can be expanded and yet good squaring characteristic can be obtained by approximately selecting the value of the product (R·I0).

Figure 17:
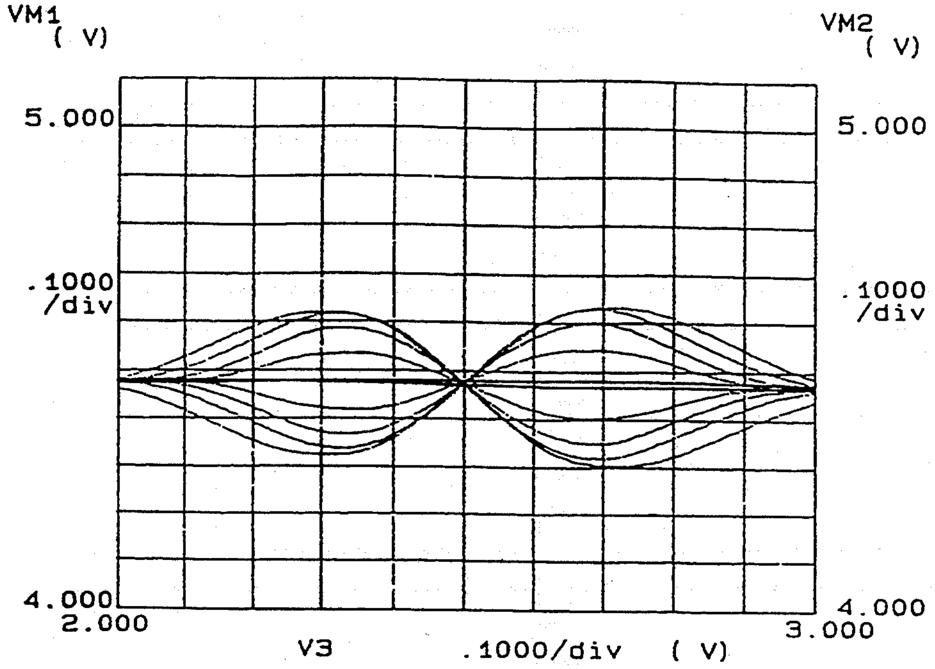
FIG. 17 is an output characteristic diagram of the multiplier according to the fourth embodiment of this invention.

Next, with K=3 and (R·I0)=8.6VT, experiments were carried out using individual components, the result of which is shown in FIG. 17. The transistor used in the experiments was of 2SC2785. From FIG. 17, it can be found that though there appears an offset in the output because these components were individually realized, good multiplier characteristic is obtainable. In addition, this diagram was prepared in such a manner that V2 was changed as a parameter from zero (0) to 400 mV in a step manner at an interval of 100 mV. Compared with the result shown in FIG. 8, it can be found that the input voltage range is expanded approximately three times. As a result, a multiplier using the squaring circuit having emitter resistors as shown in FIG. 15 makes obtainable good multiplier characteristic and advantageously expanded input voltage range.

[Fifth Embodiment]

Figure 18:
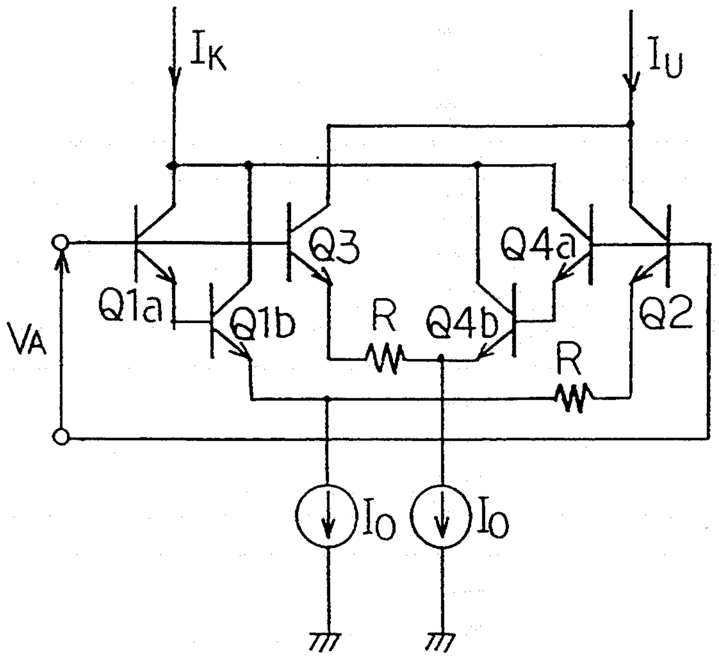
FIG. 18 is a circuit diagram of a squaring circuit to be used for a multiplier according to a fifth embodiment of this invention.

FIG. 18 shows a squaring circuit to be used for a multiplier according to a fifth embodiment of this invention, which comprises two squaring circuits combinedly arranged as shown in FIG. 4, and substantially equal in structure to that in the first embodiment shown in FIG. 4 excepting that two sets of differential transistor pairs respectively have transistors (Q1*a* and Q1*b*) and (Q4*a* and Q4*b*) having a Darlington connection. The transistors Q1*a*, Q1*b*, Q2, Q3, Q4*a* and Q4*b* are equal in emitter size and the transistors Q2 and Q3 each has an emitter resistor with a resistant value of R.

Figure 19:
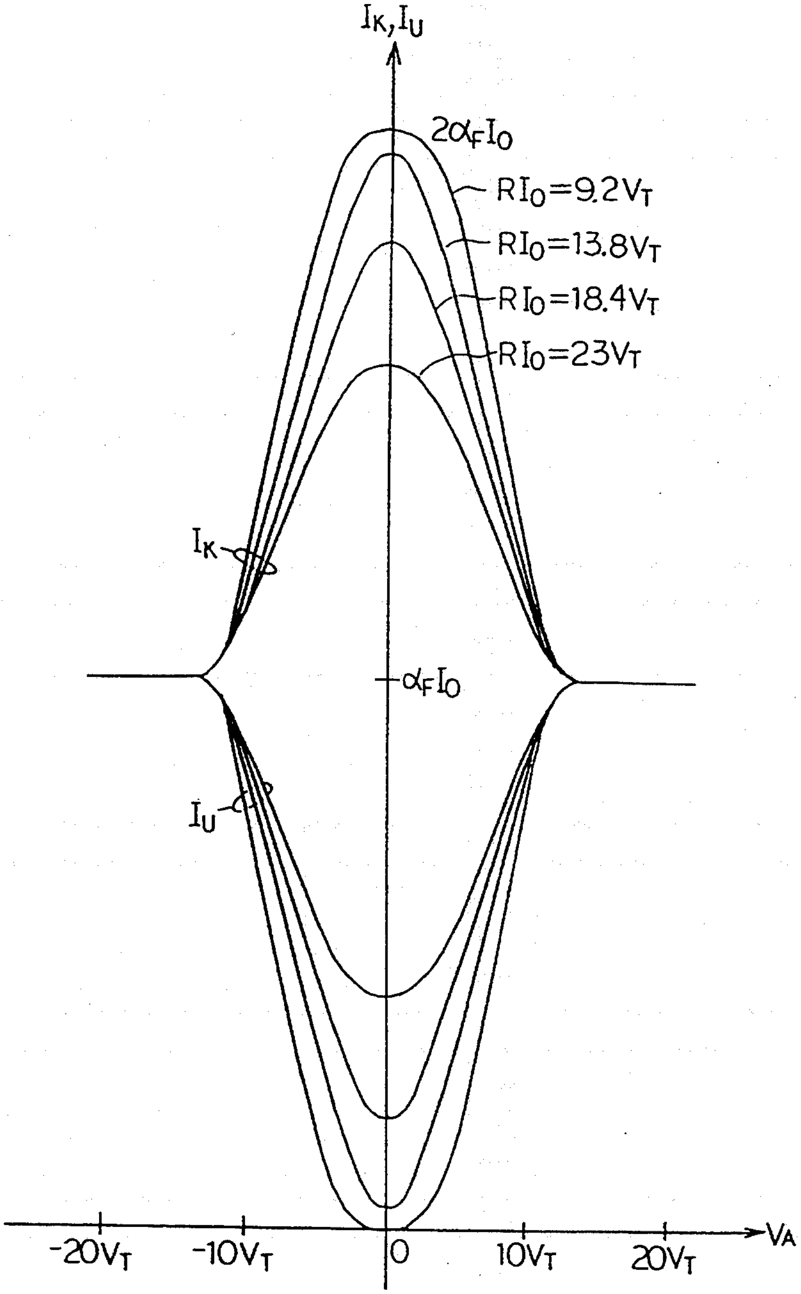
FIG. 19 is an output characteristic diagram of the squaring circuit shown in FIG. 18.

The operational characteristic cannot be analytically resolved because of including emitter resistances into differential transistor pairs. As a result, SPICE simulation values were obtained using the product (R·I0) of the resistant value R of the emitter resistor and the current value I0 of the driving current source as a parameter, which is shown in FIG. 19. From FIG. 19, it can be found that the input voltage range can be expanded and yet good squaring characteristic can be obtained by appropriately selecting the value of the product (R·I0).

Figure 20:
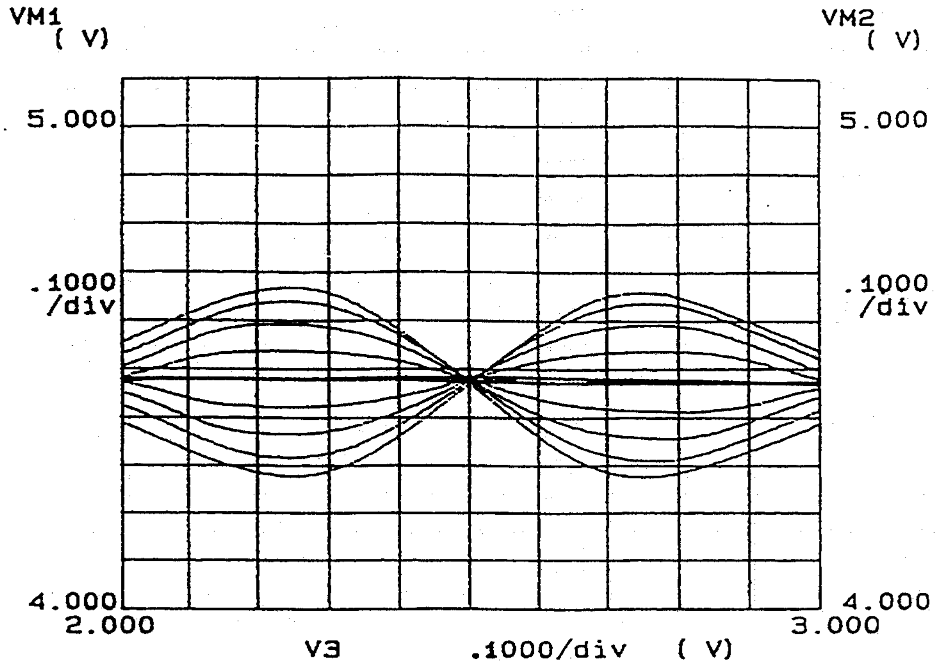
FIG. 20 is an output characteristic diagram of the multiplier according to the fifth embodiment of this invention.

Next, with K=3 and (R·I0)=8.6VT, experiments were carried out using individual components, the result of which is shown in FIG. 20. The transistor used for the experiments was of 2SC2785. From FIG. 20, it can be found that though there appears an offset in the output because these components were individually realized, good multiplier characteristic is obtainable. In addition, this diagram was prepared in such a manner that V2 was changed as a parameter from zero (0) to 400 mV in a step manner at an interval of 100 mV. Compared with the result shown in FIG. 8, it can be found that the input voltage range is expanded approximately five times. As a result, a multiplier using the squaring circuit having emitter resistors as shown in FIG. 18 makes obtainable good multiplier characteristic and yet advantageously expanded input voltage range.

[Sixth Embodiment]

Figure 21:
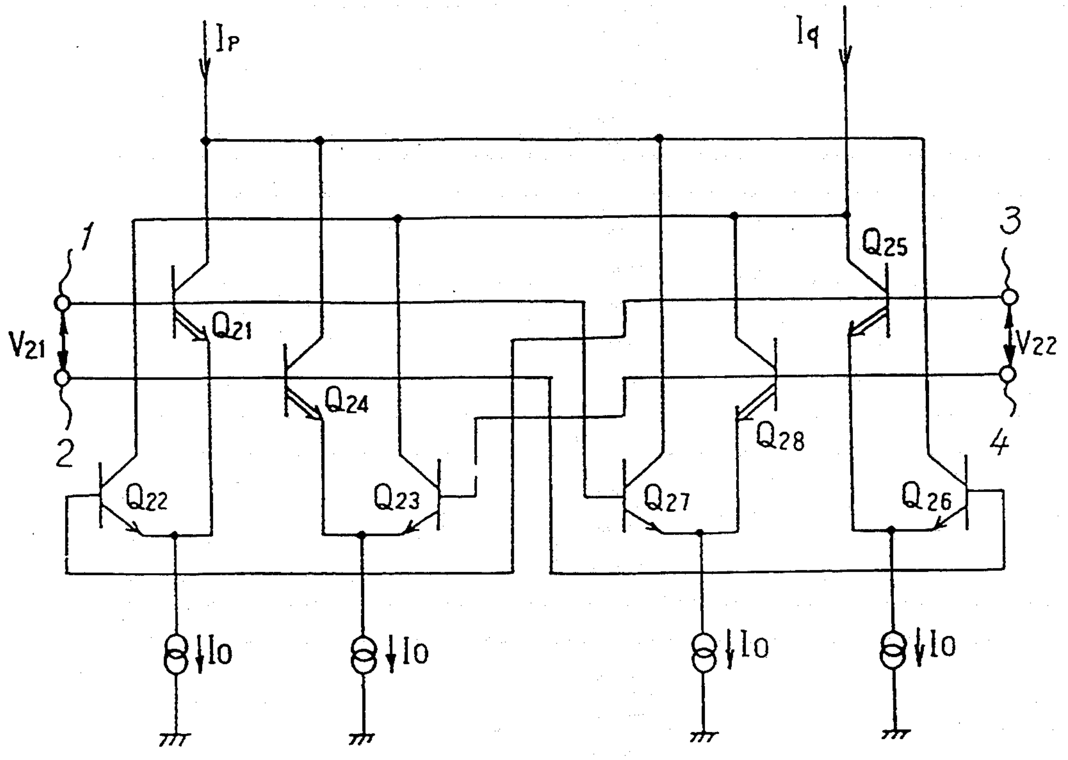
FIG. 21 is a circuit diagram of a multiplier according to a sixth embodiment of this invention.

FIG. 21 shows a multiplier according to a sixth embodiment of this invention, which is structured basically in the same manner as in the first embodiment in that four sets of differential transistor pairs (Q21 and Q22), (Q23 and Q24), (Q25 and Q26) and (Q27 and Q28) having emitters connected in common are combinedly structured. In this embodiment, the differential transistor pairs are respectively supplied with electric current in parallel, and if the emitter size of each of one transistors Q22, Q23, Q26 and Q27 is made one (1), that of each of the other transistors Q21, Q24, Q25 and Q28 is made K (K>1).

In addition, in this embodiment, the differential input terminal pair (1 and 2), and differential input terminal pair (3 and 4) are applied with input signals (voltages V21 and V22), respectively, which are equal in phase.

The four sets of differential transistor pairs as shown above are combinedly arranged in such a manner that the bases of the transistors (Q21 and Q27), (Q22 and Q25), (Q23 and Q28) and (Q24 and Q26), which are respectively unequal in emitter size to each other, are respectively connected in common, and the base of the transistor Q21 and that of the transistor Q27 are connected to the input terminal 1 of the differential input terminal pair (1 and 2) and the base of the transistor Q24 and that of the transistor Q26 are connected to the input terminal 2 of the differential input terminal pair (1 and 2). In addition, the base of the transistor Q24 and that of the transistor Q25 are connected to the input terminal 3 of the differential input terminal pair (3 and 4), and the base of the transistor Q23 and that of the transistor Q28 are connected to the input terminal 4 of the differential input terminal pair (3 and 4). On the other hand, the collectors of the four transistors Q21, Q24, Q26 and Q27 and those of the transistors Q22, Q23, Q25 and Q28 are connected in common to form differential outputs Ip and Iq, respectively. In addition, each differential transistor pair is connected to the constant current source I0.

Here, if the reference voltage is expressed as VR, respective base voltages VB21, VB22, VB23, VB24, VB25, VB26, VB27 and VB28 of the transistors of a first differential transistor pair Q21 and Q22, a second differential transistor pair Q23 and Q24, a third differential transistor pair Q25 and Q26, and a fourth differential transistor pair Q27 and Q28 can be expressed as follows;

$$VB21 = VB27 = VR + (\tfrac{1}{2})V21 \quad (39)$$

$$VB22 = VB25 = VR + (\tfrac{1}{2})V22 \quad (40)$$

$$VB23 = VB28 = VR - (\tfrac{1}{2})V22 \quad (41)$$

$$VB24 = VB26 = VR - (\tfrac{1}{2})V21 \quad (42)$$

Here, the inter-base voltage of the first differential transistor pair Q21 and Q22, and the inter-base voltage of the second differential transistor pair Q23 and Q24 can be expressed by the following equations (43) and (44), and the both are equal to each other as shown by the following equation (45), which is defined as VA for matching the first embodiment;

$$VB21 - VB22 = (\tfrac{1}{2})\,(V21 - V22) \quad (43)$$

$$VB23 - VB24 = (\tfrac{1}{2})\,(V21 - V22) \quad (44)$$

$$VB21 - VB22 = VB23 - VB24 = VA = (\tfrac{1}{2})\,(V21 - V22) \quad (45)$$

In addition, the inter-base voltage of the third differential transistor pair (Q27 and Q28), and that of the fourth differential transistor pair (Q25 and (Q26) can be expressed by the following equations (46) and (47), and the both are equal to each other as shown by the following equation (48), which is defined as VB for matching the first embodiment;

$$VB26 - VB25 = (-\tfrac{1}{2})\,(V21 + V22) \quad (46)$$

$$VB28 - VB27 = (-\tfrac{1}{2})\,(V21 + V22) \quad (47)$$

$$VB26 - VB25 = VB28 - VB27 = VB = (-\tfrac{1}{2})\,(V21 + V22) \quad (48)$$

Then, substituting VA and VB into Eq. (35), the following equation (49) can be obtained, which means that a differential current proportional to the product of the input voltages V12 and V22, thus being obtainable a multiplier circuit;

$$I \approx (-\alpha F \cdot I0 \cdot VK/8VT) \times [\{(\tfrac{1}{2})(V21 - V22)\}^2 - \{(-\tfrac{1}{2})(V21 - V22)\}^2] = \alpha F \cdot I0 \cdot (VK/4VT) \cdot V21 \cdot V22 \quad (49)$$

In addition, the differential current ΔI can be expressed as ΔI=Ip−Iq in FIGS. 4 and 21. In this case, however, due to the fact that the currents Ip and Iq are opposite in phase to each other, each of them includes such a current component as the product of the voltages V1 (V21) and V2 (V22). However, the magnitude thereof will become only half the differential current ΔI.

Even in this embodiment, such squaring circuits as shown in the second through fifth embodiments (see FIGS. 9, 12, 15 and 18) can be used instead of each squaring circuit shown in FIG. 21. As a result, the input voltage range can be expanded.

As explained above, according to the first through sixth embodiments, four sets of differential transistor pairs are not so arranged in a stack manner as in the prior art, but arranged so-called in a line transversally thereby allowing them to be operated at the same source voltage, so that the multipliers shown above can be effectively operated at lower source voltage than those in the prior art.

[Seventh Embodiment]

Figure 22:
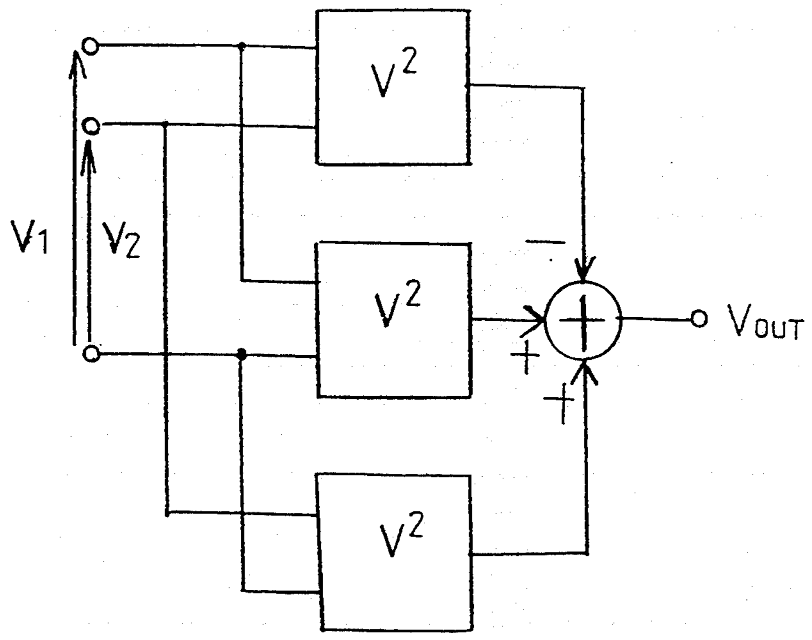
FIG. 22 is a block diagram of a multiplier according to a seventh and eighth embodiments of this invention.

FIG. 22 schematically shows a multiplier according to a seventh embodiment of this invention. In FIG. 22, three squaring circuits each has a differential input terminal pair, and a differential input voltage of a first squaring circuit becomes (V1−V2), a differential input voltage of a second squaring circuit becomes V1 and a differential input voltage of a third squaring circuit becomes V2. As a result, an output voltage VOUT of the three squaring circuits can be expressed as follows;

$$VOUT = -(V1 - V2)^2 + V1^2 + V2^2 = 2V1 \cdot V2 \quad (50)$$

This means that the output VOUT can be expressed in terms of the product (V1·V2) of respective output voltages Vl and V2 of the first and second squaring circuits, and it can be found that the circuit shown in FIG. 22 has a multiplier characteristic as the case of the two squaring circuits shown in FIG. 3.

Figure 23:
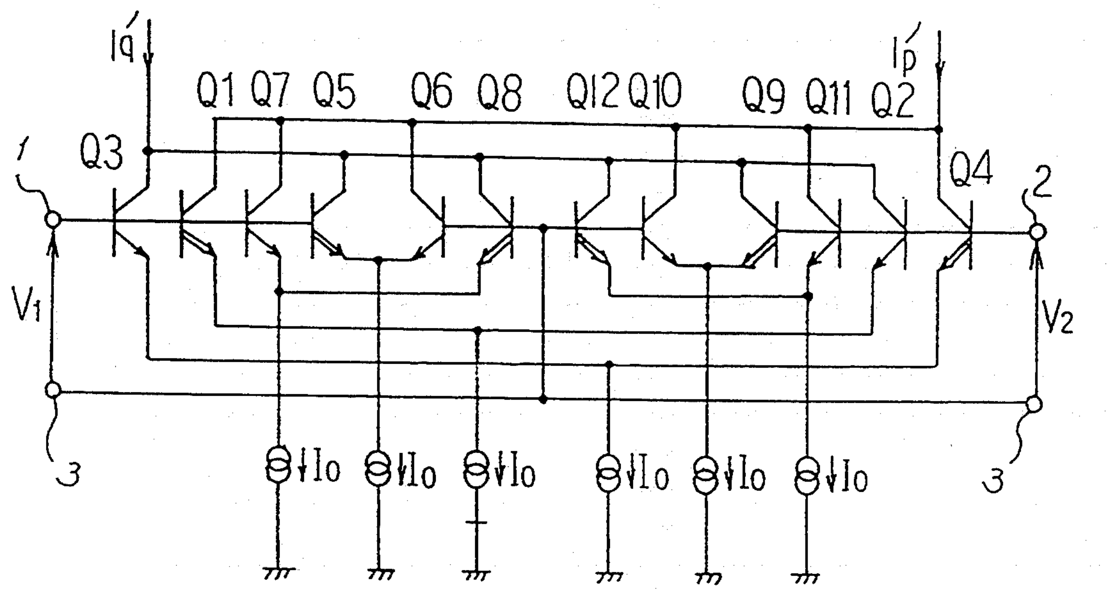
FIG. 23 is an output characteristic diagram of a multiplier according to a seventh embodiment of this invention.

FIG. 23 is a circuit diagram of the multiplier of this embodiment. This multiplier basically comprises six unbalanced differential transistor pairs (Q1 and Q2), (Q3 and Q4), (Q5 and Q6), (Q7 and Q8), (Q9 and Q1O) and (Q11 and Q12), whose emitters are connected in common, respectively. Here, if the emitter size of each of one transistors Q2, Q3, Q6, Q7, Q1O and Q11 is made one (1), that of each of the other transistors Q1, Q4, Q5, Q8, Q9 and Q12 is made K (K>1). In addition, two sets of the transistor pairs (Q1 and Q2) and (Q3 and Q4), two sets of the transistor pairs (Q5 and Q6) and (Q7 and Q8) and two sets of the transistor pairs (Q9 and Q1O) and (Q11 and Q12) respectively constitute squaring circuits and supplied with electric current in parallel to be driven by a constant current source I0.

In the three squaring circuits shown above, two sets of unbalanced differential transistor pairs of each squaring circuit are structured so that the collectors of the transistors (Q1 and Q4), (Q2 and Q3), (Q5 and Q8), (Q6 and Q7), (Q9 and Q12) and (Q1O and Q11), which are respectively equal in emitter size to each other, are connected in common, and the bases of the transistors (Q1 and Q3), (Q2 and Q4), (Q5 and Q7), (Q6 and Q8), (Q8 and Q11) and (Q1O and Q12), which are respectively unequal in emitter size to each other, are connected in common.

In addition, referring to the inter-relation between the three squaring circuits, the bases of the transistors Q1 and Q3 of the two sets of unbalanced differential transistor pairs (Q1 and Q2) and (Q3 and Q4) as the first squaring circuit and the those of the transistors Q5 and Q7 of the two sets of unbalanced differential transistor pairs (Q5 and Q6) and (Q7 and Q8) as the second squaring circuit are connected in common to the first input terminal 1, the bases of the transistors Q2 and Q4 of the first squaring circuit and those of the transistors Q9 and Q11 of the two sets of the unbalanced differential transistor pairs (Q9 and Q1O) and (Q11 and Q12) are connected in common to the input terminal 2, and the bases of the transistors Q6 and Q8 of the second squaring circuit and those of the transistors Q1O and Q12 of the third squaring circuit are connected in common to the common input terminal 3.

In addition, the collectors of the transistors Q9 and Q12) and (Q6, Q7, Q1O and Q11), which are equal in emitter size to each other in respective second and third squaring circuits, are connected in common, which are connected to the collectors of the transistors not equal in emitter size to each other of the first squaring circuit, respectively, thereby making the differential output currents Ip' and Iq'.

Also, the input terminal 1 and the common input terminal 3 makes a first input terminal pair to be applied with one input signal voltage V1 and the input terminal 2 and the common input terminal 3 makes a second input terminal pair to be applied with the other input signal voltage V2, and as shown in FIG. 23, to the input terminals 1 and 2, the polarity of one of two input signals is applied, and to the common input terminal 3, the polarity of the other thereof is applied.

With the structure as shown above, the differential currents IA and IB of the unbalanced differential transistor pairs (Q1 and Q2), (Q3 and Q4), (Q5 and Q6) and (Q7 and Q8) can be obtained in the same way as in the first embodiment (see Eqs. (30) and (34). Next, those of the unbalanced differential transistor pairs (Q9 and Q10) and (Q11 and Q12) can be obtained similarly by the following equations (51) and (52), so that the differential current IC of the both pairs can be expressed by the following equation (53), showing that it is proportional to the square of the input voltage V2.

$$IC9 - IC10 = \alpha F \cdot I0 \cdot \tanh\{(V2 + VK)/2VT\} \quad (51)$$

$$IC12 - IC11 = -\alpha F \cdot I0 \cdot \tanh\{(V2 - VK)/2VT\} \quad (52)$$

$$\begin{aligned}\Delta IC &= (IC9 + IC12) - (IC10 + IC11) \\ &= (IC9 - IC10) + (IC12 - IC11) \\ &= \alpha F \cdot I0 \cdot [\tanh\{(V2 + VK)/2VT\} - \tanh\{(V2 - VK)/2VT\}] \\ &= \alpha F \cdot I0 \cdot \{(VK/VT) - (VK/4VT3)V2^2 - (\tfrac{2}{3})(VK/2VT)^3 \ldots\}\end{aligned} \quad (53)$$

As a result, in FIG. 23, if the difference (Ip'−Iq') of the differential output currents Ip' and Iq' is expressed as ΔI', the following equation will be obtained;

$$\begin{aligned} \Delta I' &= Ip' - Iq' \\ &= -\Delta IA + \Delta IB + \Delta IC \\ &= \alpha F \cdot I0 \cdot \times [(VK/VT) - (\tfrac{2}{3})(VK/2VT)^3 - \\ &\quad (VK/4VT^8)\{V1^2 + V2^2 - (V1 - V2)^2\}\ldots] \\ &= -\alpha F \cdot I0 \times [(VK/VT) - (\tfrac{2}{3})(VK/2VT)^8 - \\ &\quad (VK/2VT^8) \cdot V1 \cdot V2 \ldots] \end{aligned} \tag{54}$$

Here, as VA=V1−V2, VB=V1 and VC=V2, the following equation (55) can be obtained;

$$\Delta I' \approx \alpha F \cdot I0 \cdot [(VK/2VT^3) \cdot V1 \cdot V2 - \}(VK/VT) - (\tfrac{2}{3})(VK/2VT)^2\}] \tag{55}$$

This means that the differential current ΔI proportional to the product (V1·V2) of the input voltages V1 and V2, resulting in obtaining a multiplier circuit.

[Eighth Embodiment]

Figure 24:
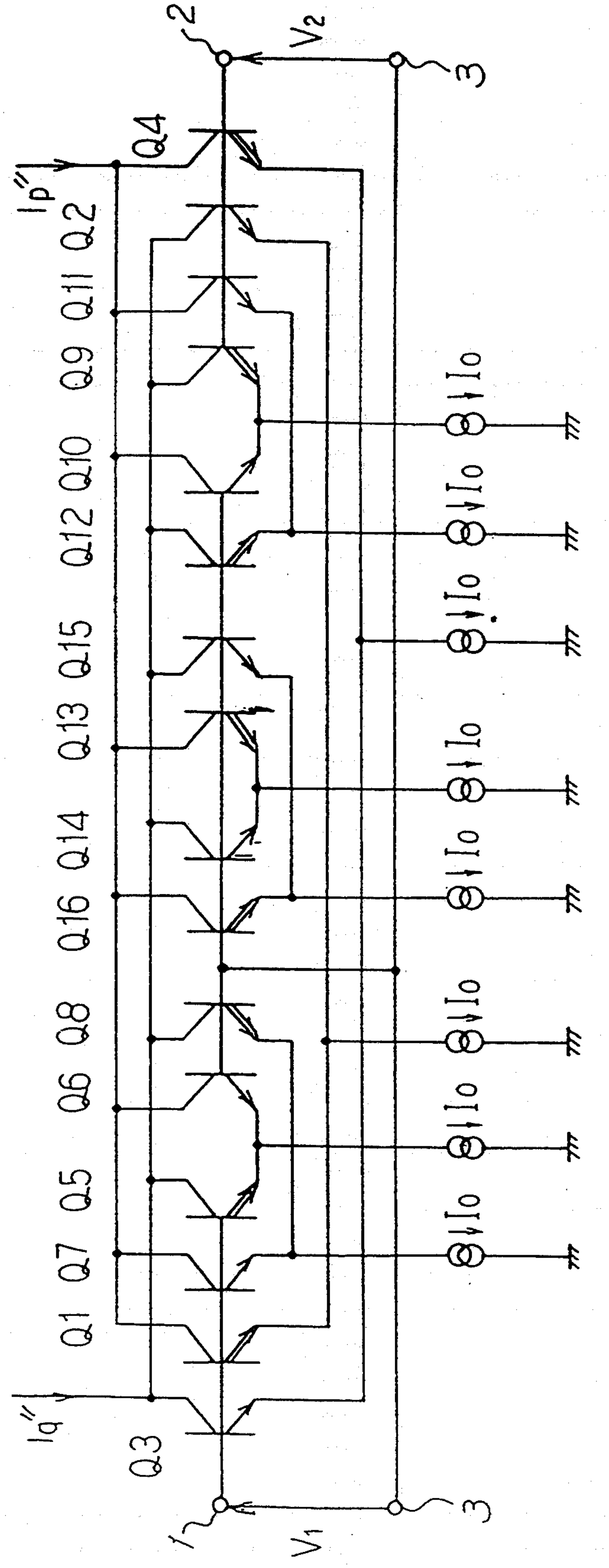
FIG. 24 is a circuit diagram of a multiplier according to an eighth embodiment of this invention.

FIG. 24 is a multiplier according to an eighth embodiment of this invention, which comprises squaring circuits having one squaring circuit added to the multiplier of the seventh embodiment, and for the sake of convenience of explanations, the transistors are indicated by the sequential reference numerals.

The multiplier of this embodiment basically comprises eight unbalanced differential transistor pairs (Q1 and Q2), (Q3 and Q4), (Q5 and Q6), (Q7 and Q8), (Q9 and Q1O), (Q11 and Q12), (Q13 and Q14) and (Q15 and Q16) respectively having the emitters connected in common. Here, if the emitter size of each of one transistors Q2, Q3, Q6, Q7, Q1O, Q11, Q14 and Q15 of the eight pairs is made one (1), the emitter size of each of the other transistors Q1, Q4, Q5, Q8, Q9, Q12, Q13 and Q16 is made K (K>1). In addition, two sets of the pairs (Q1 and Q2) and (Q3 and Q4), two sets of the pairs (Q5 and Q6) and (Q7 and Q8), two sets of the pairs (Q9 and Q1O) and (Q11 and Q12), and two sets of the pairs (Q13 and Q14) and (Q15 and Q16) respectively form squaring circuits and supplied with source currents in parallel to be driven by the constant current source I0.

In the four squaring circuit shown above, two sets of unbalanced differential transistor pairs of each squaring circuit are structured so that the collectors of the transistors (Q1 and Q4), (Q2 and Q3), (Q5 and Q8), (Q6 and Q7), (Q9 and Q12), (Q1O and Q11), (Q13 and Q16) and (Q14 and Q15), which are respectively equal in emitter size to each other, are connected in common, and the bases of the transistors (Q1 and Q3), (Q2 and Q4), (Q5 and Q7), (Q6 and Q8), (Q9 and Q11), (Q1O and Q12), (Q13 and Q15) and (Q14 and Q16), which are not equal in emitter size to each other, are connected in common.

In addition, referring to the inter-relation of the four squaring circuits shown above, the bases of the transistors Q1 and Q3 of the two sets of unbalanced differential transistor pairs (Q1 and Q2) and (Q3 and Q4) as the first squaring circuit and those of the transistors Q5 and Q7 of the two sets of unbalanced differential transistor pairs (Q5 and Q6) and (Q7 and Q8) as the second squaring circuit are connected in common to the input terminal 1, the bases of the transistors Q2 and Q4 of the first squaring circuit and those of the transistors Q9 and Q11 of the two sets of unbalanced differential transistor pairs (Q9 and Q10) and (Q11 and Q12) are connected in common to the input terminal 2, the bases of the transistors Q6 and Q8 of the second squaring circuit and those of the transistors Q14 and Q16 of the third squaring circuit are connected in common to the common input terminal 3, and the bases of the transistors Q13 and Q15 of the third squaring circuit and those of the transistors Q12 and Q10 of the fourth squaring circuit are connected in common to each other. The bases of the transistors Q13 and Q14 are connected in common to each other.

Further, the collectors of the transistors (Q1 and Q4), (Q13 and Q16), (Q3 and Q2), (Q14 and Q15), (Q5 and Q8), (Q12 and Q9), (Q6 and Q7), and (Q1O and Q11), which are respectively equal in emitter size to each other, are connected in common, and the collectors of the transistors (Q1, Q4, Q13 and Q16), (Q6, Q7, Q1O and Q11), (Q3, Q2, Q14 and Q15) and (Q12, Q8, Q5 and Q9), which are respectively not equal in emitter size to each other, are connected in common, thereby forming the differential output currents Ip'' and Iq''.

Also, similar to the case of the seventh embodiment, the input terminal 1 and the common input terminal 3 makes a first input terminal pair to be applied with one input signal (voltage V1) and the input terminal 2 and the common input terminal 3 makes a second input terminal pair to be applied with the other input signal (voltage V2), and as shown in FIG. 24, to the input terminals 1 and 2, the polarity of one of two input signals is applied, and to the common input terminal 3, the polarity of the other thereof is applied.

With the structure as shown above, in the fourth squaring circuit additionally provided, that is, the two sets of unbalanced differential transistor pairs (Q13 and Q14) and (Q15 and Q16), the collector currents (IC13 and IC14) and (IC15 and IC16) and their differential currents (IC13−IC14) and (IC16−IC15) can be obtained as follows and the differential current AID between the both can be expressed as follows;

$$IC13 - IC14 = \alpha F \cdot I0 \cdot \tanh(VK/2VT) \tag{56}$$

$$IC16 - IC15 = \alpha F \cdot I0 \cdot \tanh(VK/2VT) \tag{57}$$

$$\begin{aligned} \Delta ID &= 2\alpha F \cdot I0 \cdot \tanh(VK/2VT) \\ &= 2\alpha F \cdot I0 \cdot \{(VK/2VT) - (\tfrac{1}{3})(VK/2VT)^8 \ldots\} \\ &= \alpha F \cdot I0 \cdot \{(VK/VT) - (\tfrac{2}{3})(VK/2VT)^8 \ldots\} \end{aligned} \tag{58}$$

As a result, in FIG. 24, if the difference (Ip''−Iq'') of the differential output currents Ip' and Iq'' is expressed as ΔI'', it can be expressed by the following equation (59);

$$\begin{aligned} \Delta I'' &= Ip'' = Iq'' \\ &= -\Delta IA + \Delta IB + \Delta IC - \Delta ID \\ &= \alpha F \cdot I0 \cdot (VK/2VT^8) \cdot V1 \cdot V2 \end{aligned} \tag{59}$$

As a result, the direct current term of Eq. (55) that is, $-\alpha F \cdot I0 \cdot [(VK/VT) - (\tfrac{2}{3})(VK/2VT)^3]$, can be cancelled, thus being capable of being approximated by the following equation (60);

$$\Delta I'' \approx \alpha F \cdot I0 \cdot (VK/2VT^3) \cdot V1 \cdot V2 \tag{60}$$

Figure 25:
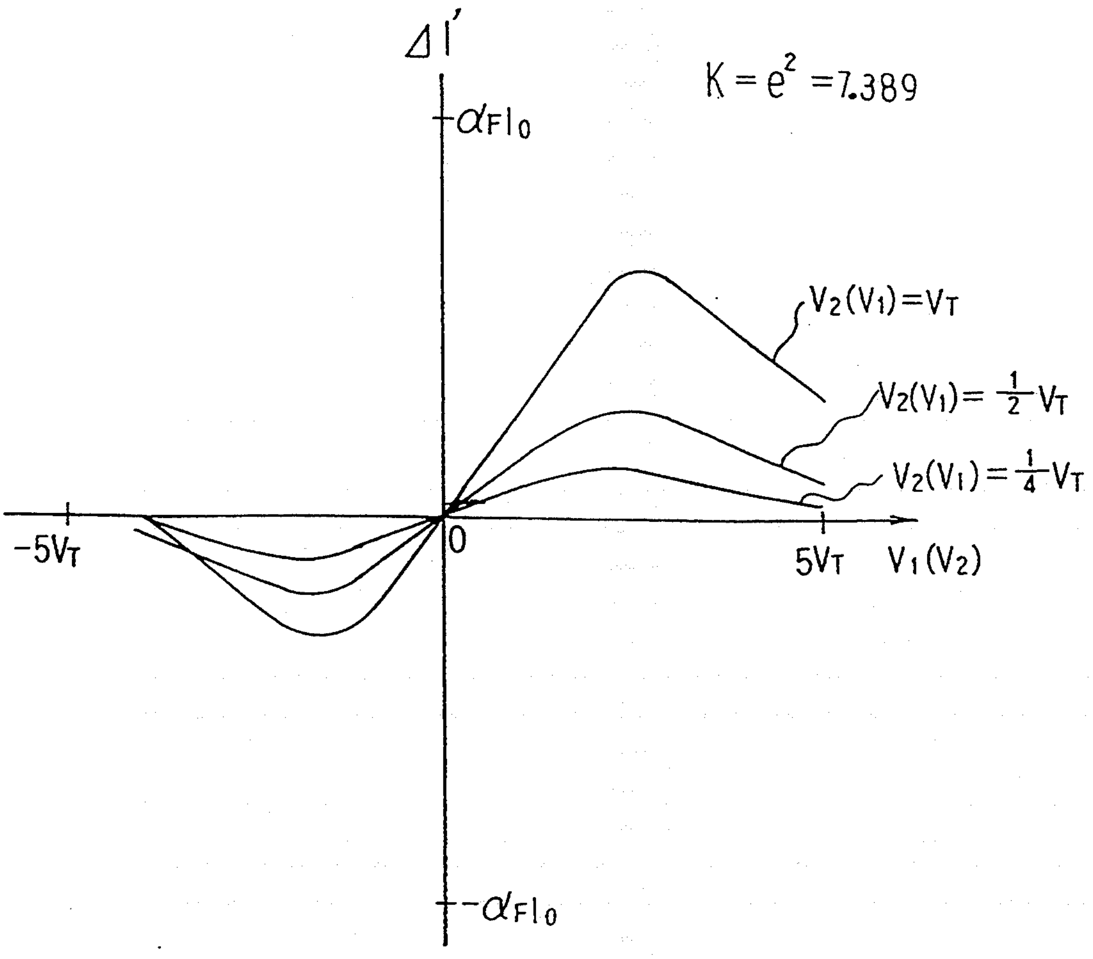
FIG. 25 is an output characteristic diagram of the multiplier shown in FIG. 24.

Therefore, in the same way as in the first embodiment, the differential current ΔI'' proportional to the product (V1·V2 ) of the input voltages V1 and V2 can be obtained, which means that a multiplier circuit can be obtained. In addition, the multiplier characteristic of this embodiment was analyzed in terms of hyperbolic tangent function, the result of which is shown in FIG. 25.

Even in the seventh and eighth embodiments of this invention, the squaring circuits described in the second through fifth embodiments can be used instead of those shown in FIGS. 23 and 24 (see FIGS. 9, 12, 15 and 18). As a result, the input voltage range can be advantageously expanded.

As explained above, in case of the multipliers shown in the seventh and eighth embodiments, six or eight unbalanced differential transistor pairs are not arranged in a stuck manner as in the prior art, but arranged so-called in a line transversally, thereby allowing them to be operated at the same source voltage, so that the multipliers shown above can be effectively operated at lower source voltage than those in the prior art.

[Ninth Embodiment]

Figure 26:
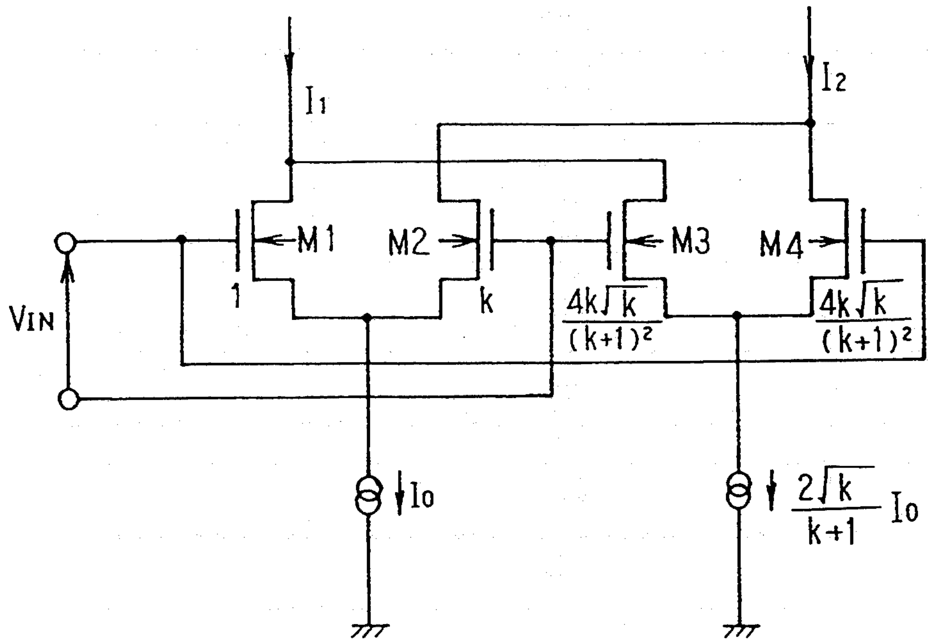
FIG. 26 is a circuit diagram of a squaring circuit to be used for a multiplier according to a ninth embodiment of this invention.

FIG. 26 shows a squaring circuit to be used for a multiplier according to a ninth embodiment of this invention, which comprises four MOS transistors. In FIG. 26, MOS transistors M1 and M2 form a first differential transistor pair to be driven by a constant current source I0, and MOS transistors M3 and M4 form a second differential transistor pair to be driven by a constant current source in conformity with the following equation (61);

$$\{2\cdot H^{\frac{1}{2}}/(H+1)\}\cdot I0 \quad (61)$$

Referring to the inter-relation between the both differential transistor pairs, the drains of the transistors M1 and M3 and those of the transistors M2 and M4 are connected in common, and the gates of the transistors M1 and M4 and and those of the transistors M2 and M3 are connected in common respectively.

Here, in the first transistor pair, the transistor M1 has a ratio of a gate width W1 and gate length L1, or W1/L1, of one (1), and the transistor M2 has a ratio of gate width W2 and gate length L2, or W2/L2, of H. Namely, H can be expressed as follows;

$$(W2/L2)/(W1/L1)=H(H\neq 1) \quad (62)$$

On the other hand, in the second differential transistor pair, the transistor M3 has a ratio of gate width and gate length, or W3/L3, and the transistor M4 has a ratio of gate width and gate length, or W4/L4, which are equal to each other as shown below;

$$(W3/L3)=(W4/L4)=4H\cdot H^{\frac{1}{2}}/(H+1)^2 \quad (63)$$

Thus, respective drain currents Id1 and Id2 of the transistors M1 and M2 of the first differential transistor pair can be expressed as follows;

$$Id1=\mu n\cdot(COX/2)\,(W1/L1)\,(VGS1-VT)^2 \quad (64)$$

$$Id2=\mu n\cdot(COX/2)\cdot H\cdot(W1/L1)\,(VGS2-VT)^2 \quad (65)$$

In addition, the constant current source I0 and the input voltage V1N can be respectively expressed as follows;

$$Id1+Id2=I0 \quad (66)$$

$$VGS1-VGS2=VIN \quad (67)$$

Here, if ΔIdp is expressed by the following equation (68);

$$\Delta Idp=Id1-Id2 \quad (68)$$

it can be obtained as follows;

$$\Delta Idp=\frac{-(1-1/H)\{(1+1/H)I0-2\beta 1\cdot VIN^2\}+4\beta 1\{(1+1/H)(I0/\beta 1)-VIN^2)\}^{\frac{1}{2}}}{(1+1/H)2} \quad (69)$$

where, $$\beta 1=\mu n(COX/2)\,(W1/L1) \quad (70)$$

Similarly, in the second differential transistor pair, respective drain currents Id3 and Id4 of the transistors M3 and M4 can be expressed as follows;

$$Id3=\{4H\cdot H^{\frac{1}{2}}/(H+1)^2\}\cdot\beta 1(VGS3-VT)^2 \quad (71)$$

$$Id4=\{4H\cdot H^{\frac{1}{2}}/(H+1)^2\}\cdot\beta 1(VGS4-VT)^2 \quad (72)$$

In addition, the constant current source and the input voltage VIN can be respectively expressed as follows;

$$Id3+Id4=\{2\cdot H^{\frac{1}{2}}/(H+1)\}\cdot I0 \quad (73)$$

$$VGS4-VGS3=VIN \quad (74)$$

Here, if $$IdQ=Id3-Id4 \quad (75)$$

it can be obtained by the following equation (76);

$$\begin{aligned} IdQ &= \{-4H\cdot H^{\frac{1}{2}}/(H+1)^2\}\cdot\beta 1\cdot VIN\times \\ &\quad [4\{H^{\frac{1}{2}}\cdot I0/(H+1)\}\cdot \\ &\quad \{(H+1)^2/4H\cdot H^{\frac{1}{2}}\cdot\beta 1\}-VIN^2]^{\frac{1}{2}} \\ &= -\{4\cdot\beta 1\cdot(1/H^{\frac{1}{2}})/(H+1)^2\}\cdot VIN\times \\ &\quad [\{4H^{\frac{1}{2}}\cdot I0/(H+1)\}\cdot \\ &\quad \{(H+1)^2/4H\cdot H^{\frac{1}{2}}\cdot\beta 1\}-VIN^2]^{\frac{1}{2}} \end{aligned} \quad (76)$$

As a result, the differential output current I can be calculated by the following equation (77):

$$\begin{aligned} \Delta I &= I1-I2=\Delta IdP-\Delta IdQ \\ &= \frac{(1-1/H)\cdot\{2\beta 1\cdot VIN^2-(1+1/H)\cdot I0\}}{(1+1/H)^2} \\ &= \{2H\cdot(H-1)\cdot\beta 1/(H+1)^2\}\cdot VIN^2- \\ &\quad \{(H-1)/(H+1)\}\cdot I0 \end{aligned} \quad (77)$$

That is, the differential output current proportional to the square of the input voltage VIN can be obtained, thus being obtainable a multiplier circuit.

As explained above, according to this embodiment, a squaring circuit comprises two sets of differential transistor pairs having gate width and gate length ratios appropriately selected for making a differential input, so that such a squaring circuit can be realized that is completely independent of variation in threshold voltage due to manufacturing dispersion of transistors. Consequently, a squaring circuit adapted to be integrated on a large-scale basis as well as to be preferably used for a multiplier can be effectively provided.

What is claimed is:

1. A multiplier comprising:

a first squaring circuit having a first differential input end pair and a first output end;

a second squaring circuit having a second differential input end pair and a second output end, said second output end being connected in common to said first output end so as to be opposite said first differential input end pair being applied with the difference of a first input signal voltage and a second input signal voltage;

said second differential input end pair being applied with the sum of said first input signal voltage and said second input signal voltage; and an output signal showing a result of multiplication of said first input signal and said second input signal being derived from said first and said second output ends common-connected; wherein said first squaring circuit includes a first differential pair of first and second transistors whose emitter sizes are different from each other, and a second differential pair of third and fourth transistors whose emitter sizes are different from each other;

said first and second transistors have emitters connected in common to a first constant current source, and bases between which said difference of said first input signal voltage and said second input signal voltage is applied;

said third and fourth transistors have emitters connected in common to a second constant current source, and bases between which said difference of said first input signal voltage and said second input signal voltage is applied;

collectors of said first and fourth transistors are connected in common, and collectors of said second and third transistors are connected in common;

said second squaring circuit includes a third differential pair of fifth and sixth transistors whose emitter sizes are different from each other, and a fourth differential pair of seventh and eighth transistors whose emitter sizes are different from each other;

said fifth and sixth transistors have emitters connected in common to a third constant current source, and bases between which said sum of said first input signal voltage and said second input signal voltage is applied;

said seventh and eighth transistors have emitters connected in common to a fourth constant current source, and bases between which said sum of said first input signal voltage and said second input signal voltage is applied;

collectors of said fifth and eighth transistors are connected in common, and collectors of said sixth and seventh transistors are connected in common; and said common-connected collectors of said first and fourth transistors and sixth and seventh transistors are connected in common to form said first output end, and said common-connected collectors of said second, third, fifth and eighth transistors are connected in common to form said second output end.

2. A multiplier as claimed in claim 1, wherein each of said first, second, third, fourth, fifth, sixth, seventh and eighth transistors has a resistor at its emitter, and is connected through said resistor to said corresponding constant current source; wherein a ratio in resistance value of said two resistors connected to said transistor having the larger emitter size and to said transistor having the smaller emitter size belonging to each of said first, second, third and fourth differential pairs is inversely proportional to a ratio in emitter size value of said corresponding two transistors.

3. A multiplier as claimed in claim 1, wherein the one of said two transistors belonging to each of said first, second, third and fourth differential pairs, which has the smaller emitter size, has a resistor at its emitter, and is connected through said resistor to said corresponding constant current source; and the other of said two transistors belonging to each of said differential pairs, which has the larger emitter size, has no resistor at its emitter.

4. A multiplier as claimed in claim 1, wherein said two transistors forming each of said first, second, third and fourth differential pairs have emitter size ratio of K:1 ($K>1$), respectively.

5. A multiplier comprising:

a first squaring circuit having a first differential input end pair and a first output end;

a second squaring circuit having a second differential input end pair and a second output end, said second output end being connected in common to said first output end so as to be opposite in phase;

said first differential input end pair being applied with the difference of a first input signal voltage and a second input signal voltage;

said second differential input end pair being applied with the sum of said first input signal voltage and said second input signal voltage; and an output signal showing a result of multiplication of said first input signal and said second input signal being derived from said first and second output ends; wherein said first squaring circuit includes a first differential pair of first and second transistors whose emitter sizes are equal to each other, and a second differential pair of third and fourth transistors whose emitter sizes are equal to each other;

said first and second transistors have emitters connected in common to a first constant current source, and bases between which said difference of said first input signal voltage and said second input signal voltage is applied;

said third and fourth transistors have emitters connected in common to a second constant current source, and bases between which said difference of said first input signal voltage and said second input signal voltage is applied;

collectors of said first and fourth transistors are connected in common, and collectors of said second and third transistors are connected in common;

said second squaring circuit includes a third differential pair of fifth and sixth transistors whose emitter sizes are equal to each other, and a fourth differential pair of seventh and eighth transistors whose emitter sizes are equal to each other;

said fifth and sixth transistors have emitters connected in common to a third constant current source, and bases between which said sum of said first input signal voltage and said second input signal voltage is applied;

said seventh and eighth transistors have emitters connected in common to a fourth constant current source, and bases between which said sum of said first input signal voltage and said second input signal voltage is applied;

collectors of said fifth and eighth transistors are connected in common, and collectors of said sixth and seventh transistors are connected in common;

said common-connected collectors of said first and fourth transistors and sixth and seventh transistors are connected in common to form said output end of said first squaring circuit, and said common-connected collectors of said second, third, fifth and eighth transistors are connected in common to form said output end of said second squaring circuit; and one of said two transistors belonging to each of said first, second, third and fourth differential pairs has a resistor at its emitter, and is connected through said resistor to said corresponding constant current source.

6. A multiplier as claimed in claim 5, wherein one of said two transistors belonging to each of said first, second, third and fourth differential pairs, which has no resistor at its emitter, has an additional transistor;

said additional transistor has an emitter connected through said resistor to said emitter of said transistor with said resistor at its emitter belonging to the same differential pair, and connected directly to said corresponding constant current source;

said additional transistor has a base connected to said emitter of said transistor without said resistor at its emitter belonging to the same differential pair; and said additional transistor has a collector connected to said collector of said transistor without said resistor at its emitter belonging to the same differential pair;

whereby said additional transistor and said transistor without said resistor at its emitter forms a Darlington connection.

7. A multiplier comprising:

a first squaring circuit having a first differential input end pair and a first output end;

a second squaring circuit having a second differential input end pair and a second output end, said second output end being connected in common so as to be opposite in phase to said first output end;

said first differential input end pair being applied with difference of a first input signal voltage and a second input signal voltage;

said second differential input end pair being applied with the sum of said first input signal voltage and said second input signal voltage; and an output signal showing a result of multiplication of said first input signal and said second input signal being derived from said first and second output ends; wherein said first squaring circuit contains a first differential pair of transistors whose emitter size ratio is K:1 ($K>1$) and a second differential pair of transistors whose emitter size ratio is K:1;

said second squaring circuit contains a third differential pair of transistors whose emitter size ratio is K:1 and a fourth differential pair of transistors whose emitter size ratio is K:1;

between said first and second differential pairs, bases of said transistors each having an emitter size of K and 1 are connected in common, respectively, to form said first differential input end pair, emitters of said transistors each having an emitter size of K and those of said transistors each having an emitter size of 1 are connected in common, respectively, and to be connected corresponding constant current sources;

between said third and fourth differential pairs, bases of said transistors each having an emitter size of K and 1 are connected in common, respectively, to form said second differential input end pair, emitters of said transistors each having an emitter size of K and those of said transistors each having an emitter size of 1 are connected in common, respectively, and to be connected corresponding constant current sources; and between said first, second, third and fourth differential pairs, collectors of said transistors of said first and second differential pairs, each having an emitter size of K, and collectors of said transistors of said third and fourth differential pairs, each having an emitter size of 1, are connected in common to form said first output end, and collectors of said transistors of said first and second differential pairs, each having an emitter size of 1, and collectors of said transistors of said third and fourth differential pairs, each having an emitter size of K, are connected in common to form said second output end.

8. A multiplier comprising:

a first squaring circuit including a first differential pair of transistors whose emitters are coupled together and whose emitter sizes are different from each other, and a second differential pair of transistors whose emitters are coupled together and whose emitter sizes are different from each other;

said base of said transistor having the larger emitter size belonging to said first differential pair and said base of said transistor having the smaller emitter size belonging to said second differential pair are connected in common to form one of a first differential input end pair;

said base of said transistor having the smaller emitter size belonging to said first differential pair and said base of said transistor having the larger emitter size belonging to said second differential pair are connected in common to form the other of said first differential input end pair;

a second squaring circuit including a third differential pair of transistors whose emitters are coupled together and whose emitter sizes are different from each other, and a fourth differential pair of transistors whose emitters are coupled together and whose emitter sizes are different from each other, said base of said transistor having the larger emitter size belonging to said third differential pair and said base of said transistor having the smaller emitter size belonging to said fourth differential pair are connected in common to form one of a second differential input end pair;

said base of said transistor having the smaller emitter size belonging to said third differential pair and said base of said transistor having the larger emitter size belonging to said fourth differential pair are connected in common to form the other of said second differential input end pair; and collectors of said transistors having the larger emitter sizes respectively belonging to said first and second differential pairs and collectors of said transistors having small emitter sizes respectively belonging to said third and fourth differential pairs being connected in common to form one of output ends, and collectors of said transistors having the smaller emitter sizes respectively belonging to said first and second differential pairs and collectors of said transistors having large emitter sizes respectively belonging to said third and fourth differential pairs being connected in common to form the other one of said output ends, wherein the difference of a first input signal voltage and a second input signal voltage is applied between said first differential input end pair, and the sum of said first input signal voltage and said second input signal voltage is applied between said second differential input end pair;

an output signal showing a result of multiplication of said first and second input signals is derived from said output ends.

9. A multiplier as claimed in claim 8, wherein each of said transistors respectively belonging to each of said first, second, third and fourth differential pairs has a resistor at its emitter; wherein a ratio of resistance value of said two resistors connected, respectively, to said transistor having the larger emitter size and connected to said transistor having the smaller emitter size belonging to each of said first, second, third and fourth differential pairs is inversely proportional to a ratio in emitter size value of said corresponding two transistors.

10. A multiplier as claimed in claim 8, wherein one of said two transistors belonging to each of said first, second, third and fourth differential pairs, which has the smaller emitter size, has a resistor at its emitter; and the other of said two transistors belonging to each of said differential pairs, which has the larger emitter size, has no resistor at its emitter.

11. A multiplier as claimed in claim 10, wherein said two transistors forming each of said first, second, third and fourth differential pairs has an emitter size ratio of K:1 (K>1).

12. A multiplier:

a first squaring circuit having a first differential input end pair and a first output end;

a second squaring circuit having a second differential input end pair and a second output end, said second output end being connected in common to said first output end so as to be opposite in phase;

said first differential input end pair being applied with the difference of a first input signal voltage and a second input signal voltage;

said second differential input end pair being applied with sum of said first input signal voltage and said second input signal voltage; and an output signal showing a result of multiplication of said first input signal and said second input signal being derived from said first and second output ends; wherein said first squaring circuit includes of a first differential pair of first and second transistors whose emitter sizes are equal to each other, and a second differential pair of third and fourth transistors whose emitter sizes are equal to each other;

said first and second transistors have emitters coupled together, and said third and fourth transistors have emitters coupled together;

said first and third transistors have bases connected in common, and said second and fourth transistors have bases connected in common, said common-connected bases forming said first differential input end pair;

said second squaring circuit includes a third differential pair of fifth and sixth transistors whose emitter sizes are equal to each other, and a fourth differential pair of seventh and eighth transistors whose emitter sizes are equal to each other;

said fifth and sixth transistors have emitters coupled together, and said seventh and eighth transistors have emitters coupled together;

said fifth and seventh transistors have bases connected in common, and said sixth and eighth transistors have bases connected in common, said common-connected bases forming said second differential input end pair;

said first, fourth, sixth and seventh transistors have collectors connected in common to form said first output end, and said second, third, fifth and eighth transistors have collectors connected in common to form said second output end, and;

said second, third, sixth and seventh transistors each has a resistor at its emitter, and said second, third, sixth and eighth transistors are connected through said resistors to said first, fourth, fifth and eighth transistors, respectively.

13. A multiplier as claimed in claim 12, wherein one of said two transistors belonging to each of said first, second, third and fourth differential pairs, which does not have a resistor at its emitter, has an additional transistor;

said additional transistor has an emitter connected through said resistor to said emitter of said transistor with said resistor at its emitter belonging to the same differential pair;

said additional transistor has a base connected to said emitter of said transistor without said resistor at its emitter belonging to the same differential pair; and said additional transistor has a collector connected to said collector of said transistor without said resistor at its emitter belonging to the same differential pair;

whereby said additional transistor and said transistor without said resistor at its emitter form a Darlington connection.

14. A multiplier comprising:

a first squaring circuit having a first differential input end pair and a first output end, said first differential input end pair being applied with difference of a first input signal voltage and a second input signal voltage;

a second squaring circuit having a second differential input end pair and a second output end, said second input end pair being applied with said first input signal voltage, and a second output end being connected opposite in phase to said first output end;

a third squaring circuit having a third differential input end pair and a third output end, said third input end pair being applied with said second input signal voltage, and a third output end being connected opposite in phase to said first output end; and an output signal showing a result of multiplication of said first input signal and said second input signal being derived from said first, second and third output ends commonly-connected; wherein said first squaring circuit includes a first differential pair of first and second transistors whose emitter sizes are different from each other and whose emitters are coupled together, and a second differential pair of third and fourth transistors whose emitter sizes are different from each other and whose emitters are coupled together;

said second squaring circuit includes a third differential pair of fifth and sixth transistors whose emitter sizes are different from each other and whose emitters are coupled together, and a fourth differential pair of seventh and eighth transistors whose emitter sizes are different from each other and whose emitters are coupled together;

said third squaring circuit includes a fifth differential pair of ninth and tenth transistors whose emitter sizes are different from each other and whose emitters are coupled together, and a sixth differential pair of eleventh and twelfth transistors whose emitter sizes are different from each other and whose emitters are coupled together;

said first transistor having a larger emitter size and said third transistor having a smaller emitter size have bases connected in common to form one end of said first input end pair, and said second transistor having a smaller emitter size and said fourth transistor having a larger emitter size have bases connected in common to form one end of said second input end pair;

said fifth transistor having a larger emitter size and said seventh transistor having a smaller emitter size have bases connected in common to said one end said first input end pair, and said sixth transistor having a smaller emitter size and said eighth transistor having a larger emitter size have bases connected in common;

said ninth transistor having a larger emitter size and said eleventh transistor having a smaller emitter size have bases connected in common to form said one end of said second input end pair, and said tenth transistor having a smaller emitter size and said twelfth transistor having a larger emitter size have bases connected in common to said bases of said sixth and eighth transistors;

said common-connected bases of said sixth, eighth, tenth and twelfth transistors form the other ends of said first and second input end pairs.

15. A multiplier as claimed in claim 14, wherein each of said first to twelfth transistors has a resistor at its emitter; wherein a ratio of resistance value of said two resistors connected, respectively, to said transistor having a larger emitter size and to said transistor having a smaller emitter size belonging to each of said first to sixth differential pairs is inversely proportional to a ratio in emitter size value of said corresponding two transistors.

16. A multiplier as claimed in claim 14, wherein the one of said two transistors belonging to each of said first, second, third and fourth differential pairs, which has a smaller emitter size, has a resistor at its emitter; and the other of said two transistors belonging to each of said differential pairs, which has a larger emitter size, has no resistor at its emitter.

17. A multiplier comprising:

a first squaring circuit having a first differential input end pair and a first output end, said first differential input end pair being applied with the difference of a first input signal voltage and a second input signal voltage;

a second squaring circuit having a second differential input end pair and a second output end, said second input end pair being applied with said first input signal voltage, and a second output end signal being connected opposite in phase to said first output end;

a third squaring circuit having a third differential input end pair and a third output end, said third input end pair being applied with said second input signal voltage, and a third output end being connected opposite in phase to said first output end; and an output signal showing a result of multiplication of said first input signal and said second input signal being derived from said first, second and third output ends; wherein said first squaring circuit includes a first differential pair of first and second transistors whose emitter sizes are equal to each other and whose emitters are coupled together, and a second differential pair of third and fourth transistors whose emitter sizes are equal to each other and whose emitters are coupled together;

said first and third transistors have bases connected in common, said common-connected bases forming one end of said first differential input end pair; and said second and fourth transistors have bases connected in common, said common-connected bases forming one end of said second differential input end pair;

said second squaring circuit includes a third differential pair of fifth and sixth transistors whose emitter sizes are equal to each other and whose emitters are coupled together, and a fourth differential pair of seventh and eighth transistors whose emitter sizes are equal to each other and whose emitters are coupled together;

said fifth and seventh transistors have bases connected in common to be connected in common to said one end of said first differential input end pair; and said sixth and eighth transistors have bases connected in common; and said third squaring circuit includes a fifth differential pair of ninth and tenth transistors whose emitter sizes are equal to each other and whose emitters are coupled together, and a sixth differential pair of eleventh and twelfth transistors whose emitter sizes are equal to each other and whose emitters are coupled together;

said ninth and eleventh transistors have bases connected in common to form said one end of said second input end pair, and said tenth and twelfth transistors have bases connected in common to said bases of said sixth and eighth transistors;

said common-connected bases of said sixth and eighth, tenth and twelfth transistors form the other ends of said first and second input end pairs;

said second, third, fifth, eighth, ninth and twelfth transistors have collectors connected in common to form said first output end and said first, fourth, sixth, seventh, tenth and eleventh transistors have collectors connected in common to form said second output end; and one of said two transistors belonging to each of said first, second, third and fourth differential pairs has a resistor at its emitter.

18. A multiplier as claimed in claim 17, wherein one of said two transistors belonging to each of said first, second, third, fourth, fifth and sixth differential pairs, which does not have a resistor at its emitter, has an additional transistor;

said additional transistor has an emitter connected through said resistor to said emitter of said transistor with said resistor at its emitter belonging to the same differential pair;

said additional transistor has a base connected to said emitter of said transistor without said resistor at its emitter belonging to the same differential pair; and said additional transistor has a collector connected to said collector of said transistor without said resistor at its emitter belonging to the same differential pair;

whereby said additional transistor and said transistor without said resistor at its emitter forms a Darlington connection.

19. A multiplier comprising:

a first squaring circuit having a first differential input end pair and a first differential output end pair, said first differential input end pair being applied with difference of a first input signal voltage and a second input signal voltage;

a second squaring circuit having a second differential input end pair and a second differential output end pair, said first differential input end pair being applied with said first input signal voltage, and said second differential output end pair being connected opposite in phase to said first differential output end pair;

a third squaring circuit having a third differential input end pair and a third differential output end pair, said third differential input end pair being applied with said second input signal voltage, and said third differential output end pair being connected opposite in phase to said first differential output end pair; and an output signal showing a result of multiplication of said first input signal and said second input signal being derived from said first, second and third differential output end pairs; wherein said first squaring circuit contains a first differential pair of transistors whose emitter size ratio is K:1 (K>1) and a second differential pair of transistors whose emitter size ratio is K:1;

said second squaring circuit contains a third differential pair of transistors whose emitters size ratio is K:1 and a fourth differential pair of transmitters whose emitter size ratio is K:1;

said third squaring circuit contains a fifth differential pair of transistors whose emitter size ratio is K:1 and a sixth differential pair of transistors whose emitter size ratio is K:1;

between said first and second differential pairs, bases of said transistors each having an emitter size of K and 1 are connected in common, respectively, to form said first differential input end pair, emitters of said transistors each having an emitter size of K and those of said transistors each having an emitter size of 1 are connected in common, respectively, collectors of said transistors each having an emitter size of K and those of said transistors each having an emitter size of 1 are connected in common, respectively, to form said first differential output end pair;

between said third and fourth differential pairs, bases of said transistors each having an emitter size of K and 1 are connected in common, respectively, to form said second differential input end pair, one end of said second differential input end pair being connected to said one end of said first differential input end pair, emitters of said transistors each having an emitter size of K and those of said transistors each having an emitter size of 1 are connected in common, respectively, collectors of said transistors each having an emitter size of K and those of said transistors each having an emitter size of 1 are connected in common, respectively, to form said second differential output end pair;

between said fifth and sixth differential pairs, bases of said transistors each having an emitter size of K and 1 are connected in common, respectively, to form said third differential input end pair, one end of said third differential input end pair being connected to the other end of said first differential input end pair being connected to the other end of said second input end pair, emitters of said transistors each having an emitter size of K and those of said transistors each having an emitter size of 1 are connected in common, respectively, collectors of said transistors each having an emitter size of K and those of said transistors each having an emitter size of 1 are connected in common, respectively, to form said third differential output end pair;

between said first, second, third, fourth, fifth and sixth differential pairs, one end of said first differential output end pair whose transistors each has an emitter size of K, one end of said second differential output end pair whose transistors each has an emitter size of 1 and one end of said third differential output end pair whose transistors each has an emitter size of 1 are connected in common, and the other end of said first differential output end pair whose transistors each has an emitter size of 1, one end of said second differential output end pair whose transistors each has an emitter size of K and one end of said third differential output end pair whose transistors each has an emitter size of K are connected in common.

20. A multiplier comprising:

a first squaring circuit having a first differential input end pair and a first output end;

a second squaring circuit having a second differential input end pair and a second output end;

a third squaring circuit having a third differential input end pair and a third output end;

a fourth squaring circuit having a fourth differential input end pair and a fourth output end;

each of said second and third output ends being connected in common to said first output end so as to be in opposite phase with said first output end, and said fourth output end being connected in common to said first output end so as to be in the same phase with said first output end;

said first differential input end pair being supplied with the difference of a first input signal voltage and a second input signal voltage;

said second differential input end pair being supplied with said first input signal voltage;

said third differential input end pair being supplied with said second input signal voltage;

said fourth differential input end pair being supplied with one of said first and second input signal voltages; wherein;

each of said first, second, third, and fourth squaring circuits includes a differential pair of transistors whose emitter sizes are different from each other.

21. A multiplier as claimed in claim 20, wherein each of the transistors forming the differential pairs of transistors of the first, second, third, and fourth squaring circuits has a resistor at its emitter, wherein;

the ratio of the resistance value of the two resistors connected respectively to the transistor having the larger emitter size and to the transistor having the smaller emitter size belonging to each of the first, second, third, and fourth differential pairs is inversely proportional to the ratio of the emitter sizes of the corresponding two transistors.

22. A multiplier as claimed in claim 21, wherein the one of said two transistors belonging to each of said first, second, third and fourth differential pairs which has a smaller emitter size has a resistor connected to its emitter, the other of said two transistors belonging to each of said first, second, third and fourth differential pairs which has the larger emitter size has no resistor connected to its emitter.

23. A multiplier comprising:

a first squaring circuit having a first differential input end pair and a first output end;

a second squaring circuit having a second differential input end pair and a second output end;

a third squaring circuit having a third differential input end pair and a third output end;

a fourth squaring circuit having a fourth differential input end pair and a fourth output end;

each of said second and third output ends being connected in common with said first output end so as to be in opposite phase with said first output end and said fourth output end being connected in common to said first output end so as to be in the same phase with said first output end;

said first differential input end pair being supplied with the difference of a first input signal voltage and a second input signal voltage;

said second differential input end pair being supplied with said first input signal voltage;

said third differential input end pair being supplied with said second input signal voltage;

said fourth differential input end pair being supplied with one of said first and second input signal voltages; wherein;

each of said first, second, third, and fourth squaring circuits includes a differential pair of transistors whose emitter sizes are different from each other, and wherein one of the two transistors belonging to each of said first, second, third and fourth differential pairs has a resistor connected to its emitter.

24. A multiplier as claimed in claim 23, wherein the one of the two transistors belonging to each of said first, second, third, and fourth differential pairs which does not have a resistor connected to its emitter has an additional transistor;

said additional transistor including an emitter connected through said resistor to the emitter of the other transistor of the corresponding differential pair, said additional transistor of each differential pair including a base connected to the emitter of the transistor without a resistor connected to its emitter of its corresponding differential pair, and said additional transistor of each differential pair including a collector connected to the collector of the transistor without a resistor connected to its emitter of its corresponding differential pair, whereby said additional transistor and said transistor without a resistor connected to its emitter of each differential pair forms a Darlington connection.

25. A squaring circuit comprising:

a first differential pair of first and second MOS transistors driven by a first constant current source;

a second differential pair of third and fourth MOS transistors which are driven by a second constant current source;

drains of said first and third MOS transistors being connected in common to form one of output end pair, and drains of said second and fourth MOS transistors being connected in common to form the other of said output end pair;

gates of said first and fourth MOS transistors being connected in common to form one of input end pair, and gates of said second and third MOS transistors are connected in common to form the other of said input end pair; and sources of said first and second MOS transistors being connected in common to said first constant current source, and sources of said third and fourth MOS transistors being connected in common; wherein a gate-width (W) and gate-length (L) ratio (W/L) of said first MOS transistor is one (1), a gate-width (W) and gate-length (L) ratio (W/L) of said second MOS transistor is H ($H \neq 1$)

gate-width (W) and gate-length (L) ratios (W/L) of said third MOS transistor and said fourth MOS transistor are equal to each other and said ratios are $$\{4H \cdot H^{\frac{1}{2}}/(H+1)^2\}; \text{ and}$$

when a current value of said first constant current source is $I_0$, a current value of said second constant current source is $$\{2 \cdot H^{\frac{1}{2}}/(H+1)\} \cdot I_0.$$

26. A multiplier comprising:

a first squaring circuit having a first differential input end pair and a first output end;

a second squaring circuit having a second differential input end pair and a second output end, said second output end being connected in common to said first output end so as to be opposite in phase;

said first differential input end pair being applied with a first input signal voltage;

said second differential input end pair being applied with a second input signal voltage equal in phase to said first input signal voltage; and an output signal showing a result of multiplication of said first input signal and said second input signal being derived from said first and said second output ends commonly-connected; wherein said first squaring circuit contains a first differential pair of first and second transistors whose emitter sizes are different from each other and whose emitters are coupled together, and a second differential pair of third and fourth transistors whose emitter sizes are different from each other whose emitters are coupled together;

said second squaring circuit contains a third differential pair of fifth and sixth transistors whose emitter size are different from each other and whose emitters are coupled together, and a fourth differential pair of seventh and eighth transistors whose emitter sizes are different from each other whose emitters are coupled together;

said first transistor having a larger emitter size and said seventh transistor having a smaller emitter size have bases connected in common, and said second transistor having a smaller emitter size and said fifth transistor having a larger emitter size have bases connected in common;

said third transistor having a smaller emitter size and said eighth transistor having a larger emitter size have bases connected in common, and said fourth transistor having a larger emitter size and said sixth transistor having a smaller emitter size have bases connected in common;

said first input signal voltage is applied between said common-connected bases of said first and seventh transistors and said common-connected bases of said fourth and sixth transistors, and said second input signal voltage is applied between said common-connected bases of said second and fifth transistors and said common-connected bases of said third and eighth transistors;

collectors of said first and fourth transistors having larger emitter sizes and collectors of said sixth and seventh transistors having smaller emitter sizes are connected in common to form said first output end; and collectors of said second and third transistors having smaller emitter sizes and collectors of said fifth and eighth transistors having larger emitter sizes are connected in common to form said second output end.

27. A multiplier as claimed in claim 26, wherein each of the first, second, third, fourth, fifth, sixth, seventh, and eighth transistors has a resistor at its emitter, wherein;

the ratio of the resistance value of the two resistors connected respectively to the transistor having the larger emitter size and to the transistor having the smaller emitter size belonging to each of the first, second, third, and fourth differential pairs is inversely proportional to the ratio of the emitter sizes of the corresponding two transistors.

28. A multiplier as claimed in claim 26, wherein, the one of the two transistors belonging to each of said first, second, third, and fourth differential pairs, which has the smaller emitter size has a resistor connected to its emitter; and the other of said two transistors of said differential pairs, which has the larger emitter size, not being connected to a resistor.

* * * * *

UNITED STATES PATENT AND TRADEMARK OFFICE

CERTIFICATE OF CORRECTION

PATENT NO. : 5,438,296

DATED : August 1, 1995

INVENTOR(S) : Katsuji KIMURA

It is certified that error appears in the above-indentified patent and that said Letters Patent is hereby corrected as shown below:

Col. 2, line 20, delete "V42" and insert --V41--.

Col. 3, line 15, delete "paris" and insert --pairs--.

Col. 3, line 43, delete "resistior" and insert --resistor--.

Col. 6, line 7, delete "fist" and insert --first--.

Col. 8, line 40, delete "01" and insert --Q1--.

Col. 9, line 39, delete "'VT" and insert --2VT--.

Col. 10, line 30, delete "$8VT^8$)" and insert --$8VT^3$)--.

Col. 12, line 25, delete "i t" and insert --it--.

Col. 16, line 27, before "Q9" insert --Q5, Q8--.

Col. 17, line 9, delete "$4VT^8$)" and insert --$4VT^3$)--.

Col. 17, line 11, delete "$2VT)^8$" and insert --$2VT)^3$--.

Col. 17, line 12, delete "$2VT^8$) and insert --$2VT^3$--

UNITED STATES PATENT AND TRADEMARK OFFICE

CERTIFICATE OF CORRECTION

PATENT NO. : 5,438,296

DATED : August 1, 1995

INVENTOR(S) : Katsuji KIMURA

It is certified that error appears in the above-indentified patent and that said Letters Patent is hereby corrected as shown below:

Col. 18, line 37, delete "AID" and insert --ΔID--.

Col. 18, line 44, delete "$2VT)^8$" and insert --$2VT)^3$--.

Col. 18, line 46, delete "$2VT)^8$" and insert --$2VT)^3$--.

Col. 18, line 49, delete "$I_p$'" and insert --$I_p$"--.

Col. 18, line 56, delete "$2VT^8)$" and insert --$2VT^3)$--.

Col. 18, line 59, delete "$2VT^3)$" and insert --$2VT^2)$--.

Col. 21, line 15, after "opposite" insert --in phase;--.

Signed and Sealed this

Second Day of April, 1996

Attest:

Bruce Lehman

BRUCE LEHMAN

*Attesting Officer* — *Commissioner of Patents and Trademarks*